(12) United States Patent
Shin et al.

(10) Patent No.: US 11,589,723 B2
(45) Date of Patent: Feb. 28, 2023

(54) ROBOT CLEANER AND CONTROLLING METHOD THEREOF

(71) Applicant: LG ELECTRONICS INC., Seoul (KR)

(72) Inventors: Yonggil Shin, Seoul (KR); Jeong Uk Cha, Seoul (KR); GaYeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 314 days.

(21) Appl. No.: 15/931,204

(22) Filed: May 13, 2020

(65) Prior Publication Data
US 2021/0093144 A1  Apr. 1, 2021

(30) Foreign Application Priority Data

Sep. 26, 2019 (KR) .................. 10-2019-0119136

(51) Int. Cl.
*A47L 11/40* (2006.01)
*A47L 11/03* (2006.01)
(Continued)

(52) U.S. Cl.
CPC ........... *A47L 11/4011* (2013.01); *A47L 11/03* (2013.01); *A47L 11/4036* (2013.01);
(Continued)

(58) Field of Classification Search
CPC .. A47L 11/0411; A47L 11/03; A47L 11/4036; A47L 11/4061; A47L 11/4066;
(Continued)

(56) References Cited

U.S. PATENT DOCUMENTS

| 4,089,446 | A | * | 5/1978 | Logan, II | ................ B60S 3/044 |
| | | | | | 222/626 |
| 2006/0293788 | A1 | * | 12/2006 | Pogodin | ............... G05D 1/0011 |
| | | | | | 701/23 |

(Continued)

FOREIGN PATENT DOCUMENTS

| CN | 109091087 | 12/2018 |
| CN | 208837835 | 5/2019 |

(Continued)

OTHER PUBLICATIONS

International Search Report dated Sep. 18, 2020 issued in International Application No. PCT/KR2020/007165.
(Continued)

*Primary Examiner* — Khoi H Tran
*Assistant Examiner* — Nhi Q Bui
(74) *Attorney, Agent, or Firm* — Ked & Associates, LLP

(57) ABSTRACT

A robot cleaner and a method of controlling the robot cleaner are disclosed. The robot cleaner may include a body, a mop, an actuator, a battery, a tank, and a controller. The controller controls a supply of liquid from the water tank to the mop, and the supply of the liquid may be controlled in consideration of a state of the battery. Water injection may be
(Continued)

controlled according to an expected use time of the battery, such that the mop can maintain an appropriate water content, and uniform mopping and cleaning can be performed.

18 Claims, 12 Drawing Sheets

(51) Int. Cl.
*G05D 1/02* (2020.01)
*B25J 11/00* (2006.01)

(52) U.S. Cl.
CPC ........ *B25J 11/0085* (2013.01); *G05D 1/0217* (2013.01); *G05D 1/0219* (2013.01); *A47L 2201/04* (2013.01); *A47L 2201/06* (2013.01)

(58) Field of Classification Search
CPC ............. A47L 11/4069; A47L 11/4072; A47L 11/4038; A47L 11/283; A47L 11/4088; A47L 11/4005; A47L 11/4083; A47L 2201/04; A47L 2201/06; A47L 2201/00; A47L 2201/0233; A47L 2201/024; A47L 11/00; A47L 11/24; A47L 11/4016; A47L 11/4044; A47L 2401/06; B25J 11/0085; B25J 19/005; G05D 1/0217; G05D 1/0219; G05D 1/0225; G05D 2201/0203; G05D 2201/0215; Y02T 10/70; Y02T 10/7072

See application file for complete search history.

(56) References Cited

U.S. PATENT DOCUMENTS

| | | |
|---|---|---|
| 2014/0209122 A1* | 7/2014 | Jung ........................ A47L 11/24 15/3 |
| 2014/0259478 A1 | 9/2014 | Conrad |
| 2016/0242613 A1* | 8/2016 | Dooley ................... A47L 11/12 |
| 2016/0309973 A1* | 10/2016 | Sheikh ................ A47L 11/4044 |
| 2017/0049288 A1 | 2/2017 | Knutson et al. |
| 2018/0369874 A1* | 12/2018 | Jiang ........................ H02S 40/10 |
| 2019/0038106 A1* | 2/2019 | Jang .................... A47L 11/4041 |
| 2019/0216285 A1 | 7/2019 | Jang et al. |
| 2019/0278269 A1* | 9/2019 | He ......................... A01D 43/02 |

FOREIGN PATENT DOCUMENTS

| | | | |
|---|---|---|---|
| EP | 3138458 A1 * | 3/2017 | ............... A47L 9/28 |
| KR | 10-2015-0006525 | 1/2015 | |
| KR | 10-1578893 | 12/2015 | |
| KR | 10-1613446 | 4/2016 | |
| KR | 10-2019-0000895 | 1/2019 | |
| KR | 10-2019-0015934 | 2/2019 | |
| KR | 10-2000068 | 7/2019 | |
| WO | WO 2017/031365 | 2/2017 | |

OTHER PUBLICATIONS

Chinese Office Action dated Sep. 15, 2022 issued in Application No. 202080064713.8.

\* cited by examiner

ROBOT CLEANER AND CONTROLLING METHOD THEREOF

CROSS-REFERENCE TO RELATED APPLICATION

This present application claims priority under 35 U.S.C. § 119 to Korean Patent Application No. 10-2019-0119136, filed Sep. 26, 2019, the entire disclosure of which is incorporated herein by reference.

BACKGROUND

1. Field

The present disclosure relates to a robot cleaner and a method for controlling the robot cleaner, and more particularly, to a robot cleaner which is provided with a mop and supplies a liquid to the mop.

2. Background

A robot cleaner including various components, such as a motor, various sensors, and artificial intelligence (AI) technology, may be configured to clean an area while traveling autonomously. The robot cleaner may be implemented, for example, to clean an area based on one or more of suctioning contaminants, by a vacuum sweeping away dust, or cleaning a cleaning surface using a mop.

Korean Patent Registration No. 10-1613446 describes a first robot cleaner that includes a main body, a driving unit, a first rotating member, and a second rotating member. The first robot cleaner further includes a first cleaner element and a second cleaner element that are made of cloth, rag, a nonwoven fabric, a brush, or the like. The first cleaner element is coupled by a first fixing member to the first rotating member, and the second cleaner element is coupled by a second fixing member to the second rotating member.

In the first robot cleaner, as the first cleaner element and the second cleaner element are rotated by the first and second rotating members, foreign matter on a floor surface may be removed through friction between the first cleaner element and the second cleaner element and the floor surface. Furthermore, the frictional force can be used for moving the robot cleaner. Thus, the rotation of the first cleaner element and the second cleaner element in the first robot cleaner causes the cleaning of the floor and the movement of the robot cleaner to be performed together.

Korean Patent No. 10-2000068 describes a second robot cleaner having a mop module that includes a mop part and a collection module. The mop module may be removable from the second robot cleaner to allow the mop module to be serviced or replaced.

When mopping the floor with, for example, a rotating mop, the robot cleaner should provide a correct amount of water to dampen the mop to enable proper cleaning. The robot cleaner should supply the moisture to prevent the mop from drying out to maintain cleaning performance.

The robot cleaner may be equipped with a battery that stores and provides power for operation of the robot cleaner. If the robot cleaner provides moisture without considering a charge state of the battery or a cleaning operation of the robot cleaner, the performance and efficiency of the robot cleaner may be compromised. For example, if the robot cleaner is set to operate for a set length of time (e.g., one hour) to clean a floor surface but water stored in the robot cleaner is exhausted before the set length of time (e.g., after 30 minutes), a portion of the floor may be cleaned by wet mopping and another portion of the floor may be incorrectly cleaned using a dry mop.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
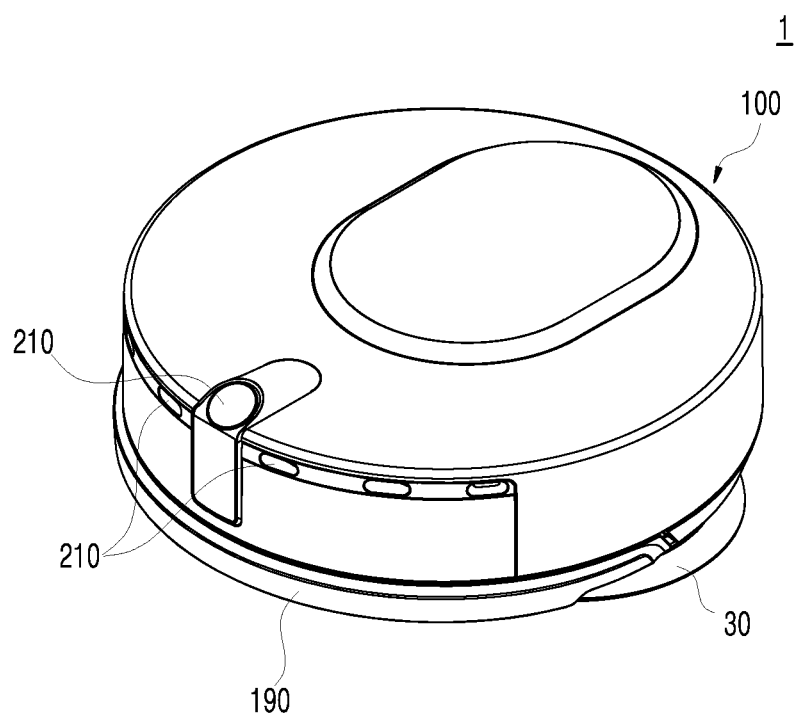
FIG. 1 is a perspective view illustrating a robot cleaner according to an embodiment of the present disclosure.
Figure 1:
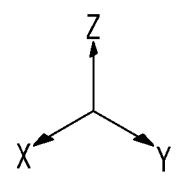
Figure 2:
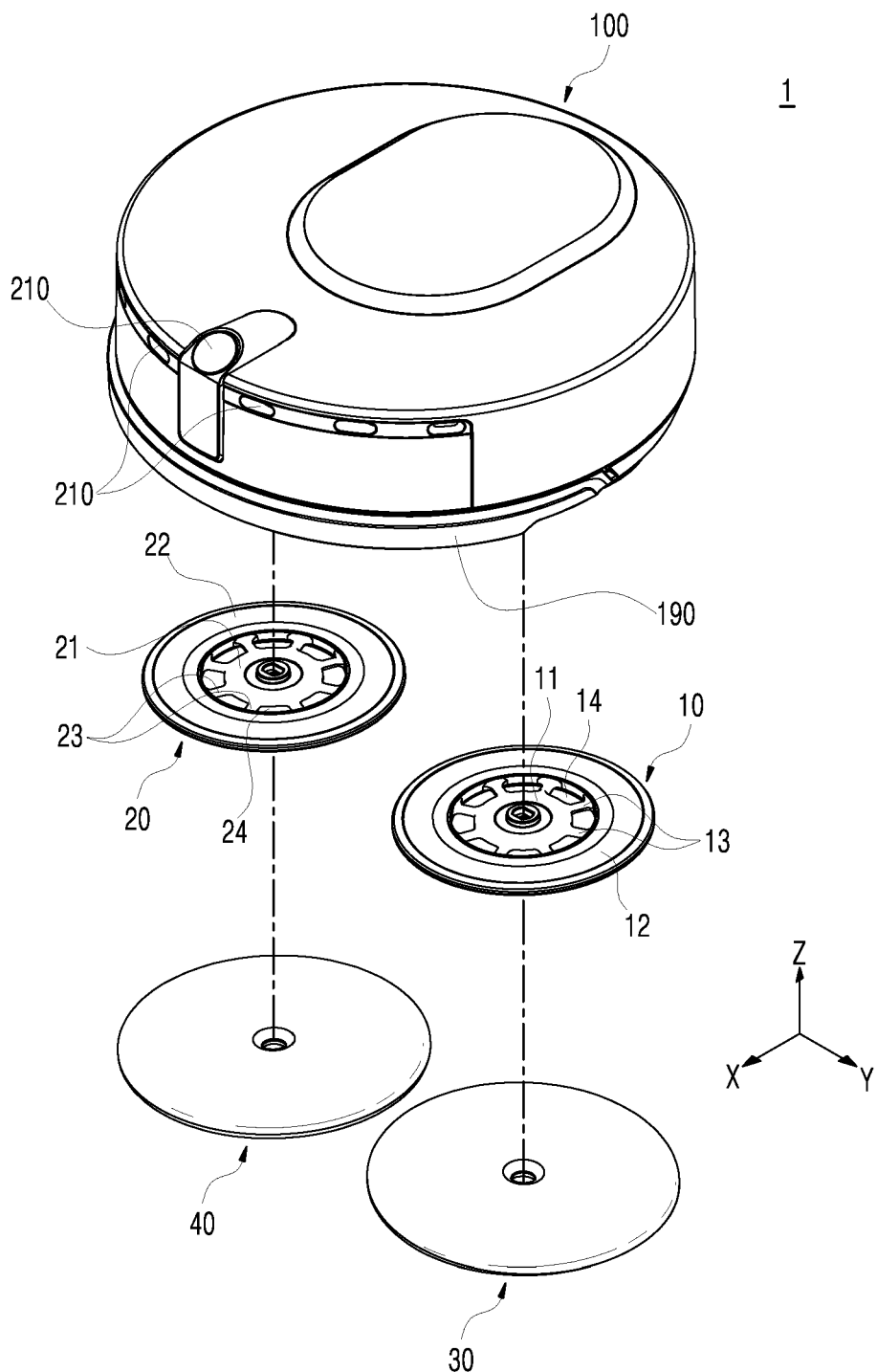
FIG. 2 is a diagram illustrating some components of the robot cleaner illustrated in FIG. 1 separately.
Figure 3:
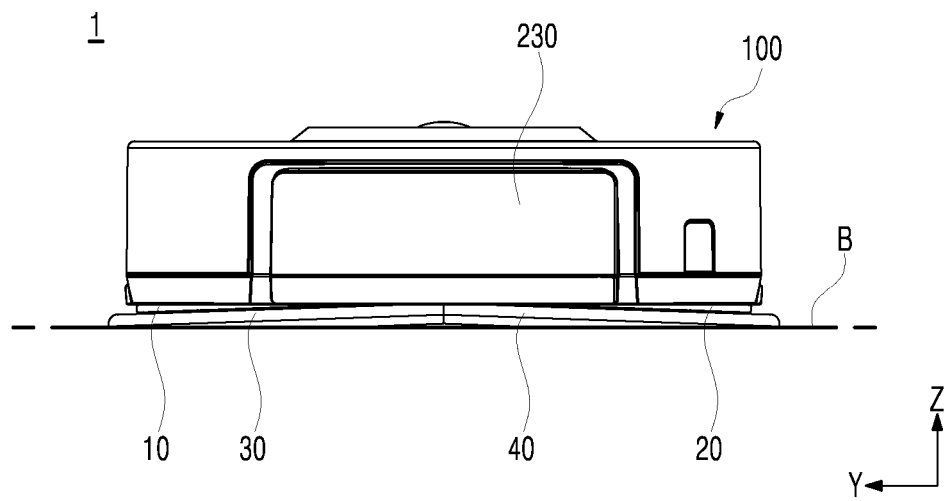
FIG. 3 is a rear view of the robot cleaner illustrated in FIG. 1.
Figure 4:
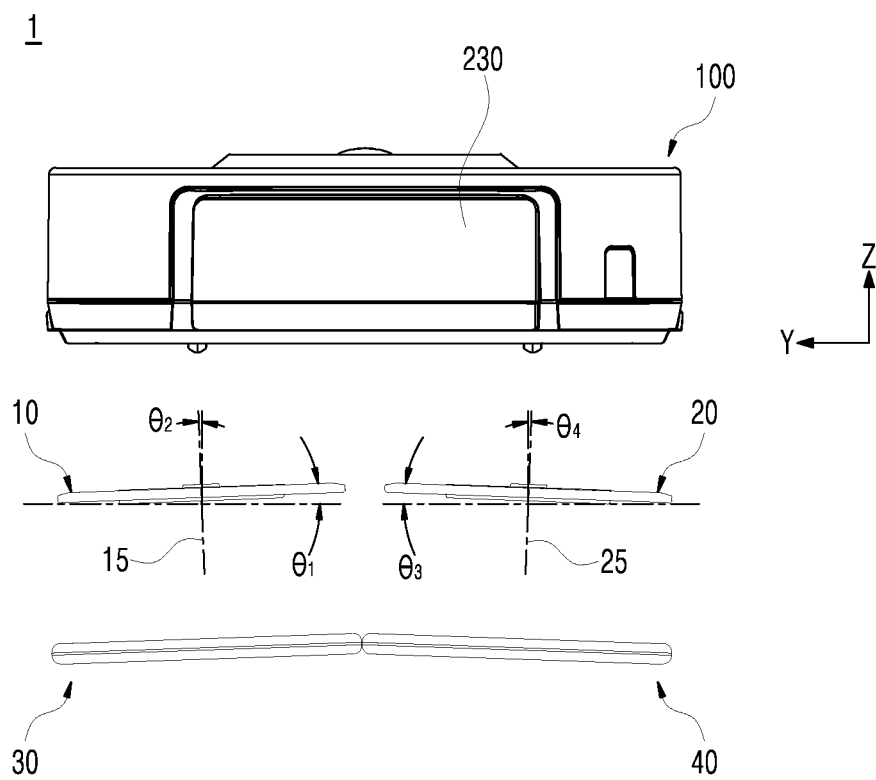
FIG. 4 is a diagram illustrating some components of the robot cleaner illustrated in FIG. 3 separately.

FIG. 1 is a perspective view showing a robot cleaner 1 according to an embodiment of the present disclosure, FIG. 2 is a diagram illustrating some components of the robot cleaner 1 illustrated in FIG. 1 in a separated state, FIG. 3 is a rear view of the robot cleaner 1 illustrated in FIG. 1, and FIG. 4 is a diagram illustrating some components of the robot cleaner 1 illustrated in FIG. 3 in a separated state.

The robot cleaner 1 according to an embodiment of the present disclosure may be placed on and clean a floor surface B while moving along the floor surface B. Accordingly, hereinafter, in a description of the robot cleaner 1, a vertical direction is set based on a state in which the robot cleaner 1 is placed on the floor surface B. Furthermore, in the following description, a side at which support wheels 120 and 130, to be described below, are coupled (e.g., a general movement direction of the robot cleaner 1) may be referred to as a front side with respect to a first rotating plate 10 and a second rotating plate 20.

The robot cleaner 1 according to an embodiment of the present disclosure may include a body 100, a first rotating plate 10, a second rotating plate 20, a first mop 30, and a second mop 40. The body 100 may form an overall appearance of the robot cleaner 1 or may be formed to have a frame shape. Each component constituting the robot cleaner 1 may be coupled directly or indirectly to the body 100, and some components constituting the robot cleaner 1 may be received within the body 100. The body 100 may be divided into a lower body 100a and an upper body 100b, and certain components of the robot cleaner 1 may be provided in a space formed when the lower body 100a and the upper body 100b are coupled to each other (see FIG. 6).

In an embodiment of the present disclosure, the body 100 may have a width (or diameter) in the horizontal direction (e.g., a direction parallel to X and Y and along the floor surface B) that is larger than a height of the body 100 in the vertical direction (direction parallel to Z that is orthogonal to the floor surface B). When having such a structure, the body 100 may advantageously help the robot cleaner 1 to have stability and avoid obstacles when moving or travelling. When viewed from above or below, the body 100 may be formed in various forms or shapes, such as a circle, an oval, or a rectangle.

A first rotating plate 10 may be formed to have a predetermined area, and may be formed in the form of a flat plate or a flat frame. The first rotating plate 10 may be generally positioned to extend substantially horizontally. As such, a width (or diameter) of the first rotating plate 10 in the horizontal direction may be set to be sufficiently larger than the height of the first rotating plate 10 in the vertical direction. The first rotating plate 10 may be coupled to the body 100 to parallel to the floor surface B, or the first rotating plate 10 may be positioned to be inclined with respect to the floor surface B.

The first rotating plate 10 may be formed in a substantially circular plate shape, and the bottom surface of the first rotating plate 10 may be formed to have a substantially circular shape. The first rotating plate 10 may be formed in a rotationally symmetrical form as a whole.

The first rotating plate 10 may include a first middle plate 11, a first outer plate 12, and first spokes 13. The first middle plate 11 may be rotatably coupled to the body 100 while forming a center of the first rotating plate 10. The first middle plate 11 may be coupled to the lower side of the body 100, and an upper surface of the first middle plate 11 may face the bottom surface of the body 100 when coupled to the body 100.

A rotation axis 15 of the first rotating plate 10 may be formed along a direction passing through the center of the first middle plate 11. In addition, the rotation axis 15 of the first rotating plate 10 may be formed along a direction orthogonal to the floor surface B, or may have a predetermined inclination with respect to the direction orthogonal to the floor surface B.

The first outer plate 12 may be formed to surround the first middle plate 11 to be spaced apart from the first middle plate 11. The first spokes 13 may connect the first middle plate 11 and the first outer plate 12. Multiple first spokes 13 may be provided, and the first spokes 13 may be repeatedly formed along the circumferential direction of the first middle plate 11. The first spokes 13 may be arranged at substantially equal intervals between the first middle plate 11 and the first outer plate 12 to define a plurality of holes 14 that penetrate vertically between the first spokes 13. A liquid, such as water, a cleaning or disinfecting fluid, a floor wax, etc. may be discharged from a liquid supply tube 240 (to be described below) and transferred to the first mop 30 through the holes 14.

In the robot cleaner 1 according to an embodiment of the present disclosure, the bottom surface of the first rotating plate 10 may be coupled to the body 100 to form a predetermined inclination with respect to the floor surface B. As described herein, the rotation axis 15 of the first rotating plate 10 may have a particular inclination with respect to a direction perpendicular to the floor surface B.

In the robot cleaner 1 according to an embodiment of the present disclosure, a first angle 81, which is formed between the bottom surface of the first rotating plate 10 and the floor surface B, may be correspond to a second angle 82, which is formed between the rotation axis 15 of the first rotating plate 10 and a direction perpendicular to the floor surface B. Accordingly, when the first rotating plate 10 rotates with respect to the body 100, the bottom surface of the first rotating plate 10 may be configured to maintain a same angle with the floor surface B.

The second rotating plate 20 may be formed to have a predetermined area, and the second rotating plate 20 may be formed substantially in the form of a flat plate or a flat frame. The second rotating plate 20 may be generally formed to extend horizontally. As such, a width (or diameter) of the second rotating plate 20 in the horizontal direction may be set to be sufficiently larger than the height in the vertical direction. The second rotating plate 20 may be coupled to the body 100 to be position substantially parallel to the floor surface B or may be inclined with respect to the floor surface B.

The second rotating plate 20 may be formed in a circular plate shape, and the bottom surface of the second rotating plate 20 may generally have a circular shape. The second rotating plate 20 may be formed in a rotationally symmetrical form as a whole.

The second rotating plate 20 may include a second middle plate 21, a second outer plate 22, and second spokes 23. The second middle plate 21 may be rotatably coupled to the body 100 while forming the center of the second rotating plate 20. The second middle plate 21 may be coupled to the lower side of the body 100, and the upper surface of the second middle plate 21 may face the bottom surface of the body 100 when coupled to the body 100.

A rotation axis 25 of the second rotating plate 20 may be formed along a direction passing through the center of the second middle plate 21. In addition, the rotation axis 25 of the second rotating plate 20 may be formed along a direction orthogonal to the floor surface B, or may have a predetermined inclination with respect to the direction orthogonal to the floor surface B.

The second outer plate 22 may be formed to substantially surround and to be spaced apart from the second middle plate 21. The second spokes 23 connect the second middle plate 21 and the second outer plate 22. Multiple second spokes 23 may be provided, and the second spokes 23 may be formed along the circumferential direction of the second middle plate 21. The second spokes 23 may be spaced apart, such as being arranged at substantially equal intervals, to define a plurality of holes 24 between the second spokes 23. A liquid, such as water, a cleaning or disinfecting fluid, a floor wax, etc. may be discharged from the water supply tube 240 and through the holes 24 to be transferred to the second mop 40.

In the robot cleaner 1 according to an embodiment of the present disclosure, the bottom surface of the second rotating plate 20 may be coupled to the body 100 may form a predetermined inclination with respect to the floor surface B. For example, the rotation axis 25 of the second rotating plate 20 may have a predetermined inclination with respect to a direction perpendicular to the floor surface B.

In the robot cleaner 1 according to an embodiment of the present disclosure, a third angle 83 is formed between the bottom surface of the second rotating plate 20 and the floor surface B may correspond to a fourth angle 84 formed between the rotation axis 25 of the second rotating plate 20 and a direction perpendicular to the floor surface B (e.g., a vertical direction). Accordingly, when the second rotating plate 20 rotates with respect to the body 100, the bottom surface of the second rotating plate 20 may be configured to maintain an angle with respect to the floor surface B.

In the robot cleaner 1 according to an embodiment of the present disclosure, the position of the second rotating plate 20 may substantially correspond to the position of the first rotating plate 10, or the second rotating plate 20 may be formed to be positioned symmetrical with respect to the first rotating plate 10. For example, the first rotating plate 10 may be located on the left side of the robot cleaner 1, and the second rotating plate 20 may be located on the right side of the robot cleaner 1, such that the first rotating plate 10 and the second rotating plate 20 may be symmetrical with each other with respect to central axis extending in a front-to-back direction of the cleaner 1.

The first mop 30 may be formed so that a bottom surface thereof that faces the floor has a predetermined area, and the first mop 30 has a flat shape. The first mop 30 may have a shape in which a width (or diameter) in the horizontal direction of the first mop 30 may be significantly greater than a height of the first mop 30 in the vertical direction. When the first mop 30 is coupled to the body 100, the bottom surface of the first mop 30 may be positioned substantially parallel to the floor surface B or may be inclined with respect to the floor surface B.

The bottom surface of the first mop 30 may be generally circular. The first mop 30 may be formed in a rotationally symmetrical form as a whole.

The first mop 30 may be made of various materials that can clean the floor while being in contact with the floor. To this end, the bottom surface of the first mop 30 may include, for example, one or more of a cloth made of a woven or knitted fabric, a nonwoven fabric, or a brush having a predetermined area.

In the robot cleaner 1 according to an embodiment of the present disclosure, the first mop 30 may be designed to be detachably coupled to the bottom surface of the first rotating plate 10, and when coupled to the first rotating plate 10, the first mop 30 may be rotated together with the first rotating plate 10. When coupled to the first rotating plate 10, the first mop 30 may be positioned to be in close contact with the bottom surface of the first outer plate 12 and separated from the first middle plate 11, or the first mop 30 may be positioned to be in close contact with the bottom surfaces of the first middle plate 11 and the first outer plate 12.

The first mop 30 may be attached to or detached from the first rotating plate 10 using various devices and methods. In one example, at least a portion of the first mop 30 may be hooked or fitted to the first rotating plate 10. In another example, a separate connection device, such as a clamp, screw, etc. which couples the first mop 30 to the first rotating plate 10, may be provided. In an embodiment, one fastening device, of a pair of fastening devices that can be coupled to and separated from each other, may be fixed to the first mop 30, and the other fastening device may be fixed to the first rotating plate 10. Examples of the fastening devices include a pair of magnets that attract each other, a pair of strips of Velcro that can be coupled to each other, or interlocking parts of a snap fastener (e.g., a female side and a male side) that can be coupled to each other. When the first mop 30 is coupled to the first rotating plate 10, the first mop 30 and the first rotating plate 10 may overlap each other, and a center of the first mop 30 may substantially coincide with a center of the first rotating plate 10.

The second mop 40 may be formed so that a bottom surface thereof that faces the floor surface B has a predetermined area, and the second mop 40 has a substantially flat shape. For example, the second mop 40 may have a shape in which the width (or diameter) of the second mop 40 in the horizontal direction is significantly greater than the height of the second mop 40 in the vertical direction. When the second mop 40 is coupled to the body 100, the bottom surface of the second mop 40 may be parallel to the floor surface B, or may be inclined with respect to the floor surface B.

The bottom surface of the second mop 40 may be generally circular. The second mop 40 may be formed in a rotationally symmetrical form as a whole.

Similar to the first mop 30, the second mop 40 may be made of various materials that can clean the floor while being in contact with the floor. To this end, the bottom surface of the second mop 40 may include one or more of a cloth made of a woven or knitted fabric, a nonwoven fabric, or a brush having a predetermined area.

In the robot cleaner 1 according to an embodiment of the present disclosure, the second mop 40 may be detachably coupled to the bottom surface of the second rotating plate 20, and when coupled to the second rotating plate 20, the second mop 40 may be rotated together with the second rotating plate 20. When coupled to the second rotating plate 20, the second mop 40 may be positioned to be in close contact with the bottom surface of the second outer plate 22 and separated from the second middle plate 21, or the second mop 40 may be positioned to be in close contact with the bottom surfaces of the second middle plate 21 and the second outer plate 22.

Similar to the first mop 30, the second mop 40 may be attached to or detached from the second rotating plate 20 using various devices and methods. In one example, at least a portion of the second mop 40 may be hooked or fitted to the second rotating plate 20. In another example, a separate device, such as a clamp, may couple the second mop 30 to the second rotating plate 10. In another example, one of a pair of fastening devices that may be coupled to and separated from each other may be fixed to the second mop 40 and the other of the pair of fastening devices may be fixed to the second rotating plate 20. Examples of the pair of fastening devices includes a pair of magnets that attract each other, a pair of strips of Velcro that are configured to be coupled to each other, or parts of a snap fastener (a female fastener part and a male fastener part) that are configured to be coupled to each other. When the second mop 40 is coupled to the second rotating plate 20, the second mop 40 and the second rotating plate 20 may overlap each other, and the center of the second mop 40 may substantially coincide with the center of the second rotating plate 20.

In the robot cleaner 1 according to an embodiment of the present disclosure, the first rotating plate 10 and the second rotating plate 20 may be inclined with respect to the floor surface B such that adjacent sides of the first rotating plate 10 and the second rotating plate 20 may be spaced further apart from the floor surface B than opposing sides of the first rotating plate 10 and the second rotating plate 20. For example, the first rotating plate 10 and the second rotating plate 20 may be formed such that the sides thereof that are farther from the center of the robot cleaner 1 are closer to the floor than the sides thereof that are closer to the center of the robot cleaner 1 (see, for example, FIGS. 3 and 4).

In this example in which the first rotating plate 10 and the second rotating plate 20 are inclined with respect to the floor surface B, the rotation axis 15 of the first rotating plate 10 may be perpendicular to the bottom surface of the first rotating plate 10, and the rotation axis 25 of the second rotating plate 20 may be perpendicular to the bottom surface of the second rotating plate 20. Due to this orientation and rotation, when the first mop 30 is coupled to the first rotating plate 10 and the second mop 40 is coupled to the second rotating plate 20, portions of the first mop 30 and the second mop 40 that are farther from each other may contact the floor surface B with relatively greater force.

When the first rotating plate 10 rotates, frictional force may be generated between the bottom surface of the first mop 30 and the floor surface B. At this time, since the generation point and direction of the frictional force deviate from the rotation axis 15 of the first rotating plate 10, the first rotating plate 10 may be moved against the floor surface B, and the robot cleaner 1 may move along the floor surface B.

Similarly, when the second rotating plate 20 rotates, frictional force may be generated between the bottom surface of the second mop 40 and the floor surface B. At this time, since the generation point and direction of the frictional force deviate from the rotation axis 25 of the second rotating plate 20, the second rotating plate 20 may be moved against the floor surface B, and the robot cleaner 1 may move along the floor surface B.

When the first rotating plate 10 and the second rotating plate 20 rotate at similar speeds in opposite directions, the robot cleaner 1 may move in a straight direction and move forward or backward. For example, when viewed from above, the robot cleaner 1 may move forward (e.g., toward wheels 120, 130) when the first rotating plate 10 rotates counterclockwise and the second rotating plate 20 rotates clockwise.

When only one of the first rotating plate 10 or the second rotating plate 20 rotates, the robot cleaner 1 may change direction based on the friction force associated with the rotation. When the rotation speed of the first rotating plate 10 is different from the rotation speed of the second rotating plate 20 or when the first rotating plate 10 and the second rotating plate 20 rotate in a same circular direction, the robot cleaner 1 may move while changing direction, such as to move in a curved direction.

Figure 5:
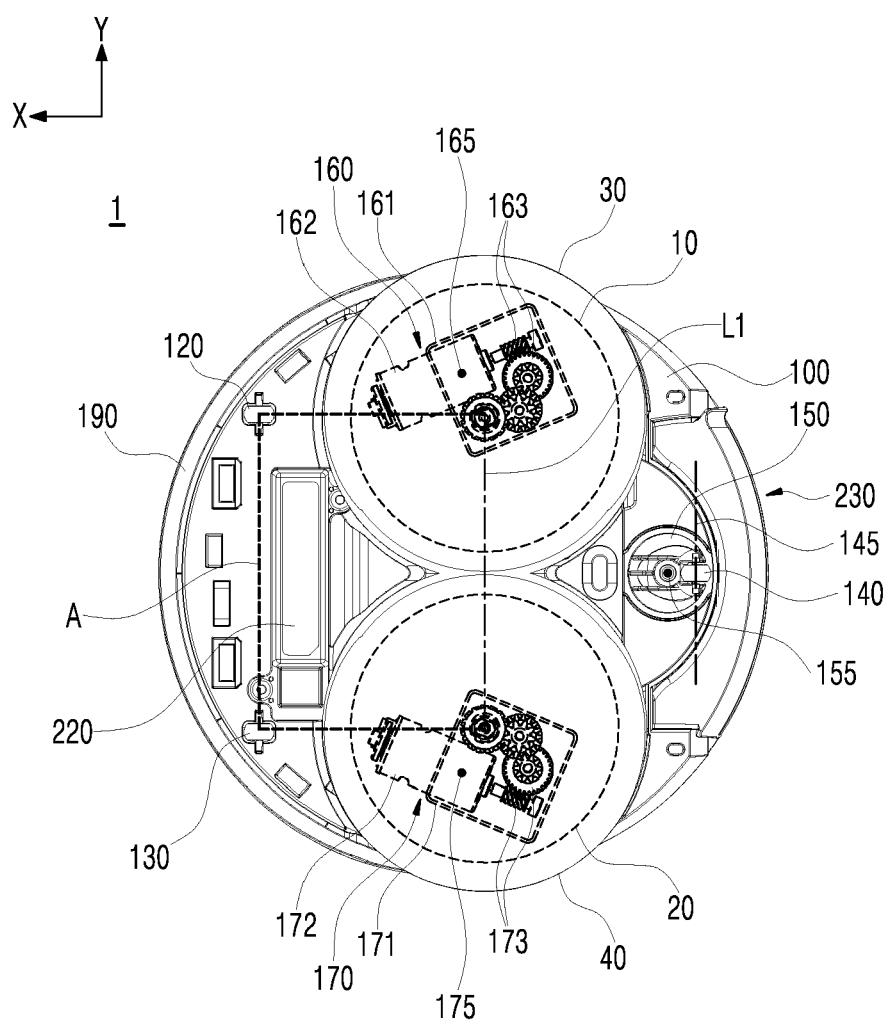
FIG. 5 is a bottom view of the robot cleaner according to an embodiment of the present disclosure, in which a first rotating plate, a second rotating plate, a first actuator and a second actuator are indicated by dotted lines.
Figure 6:
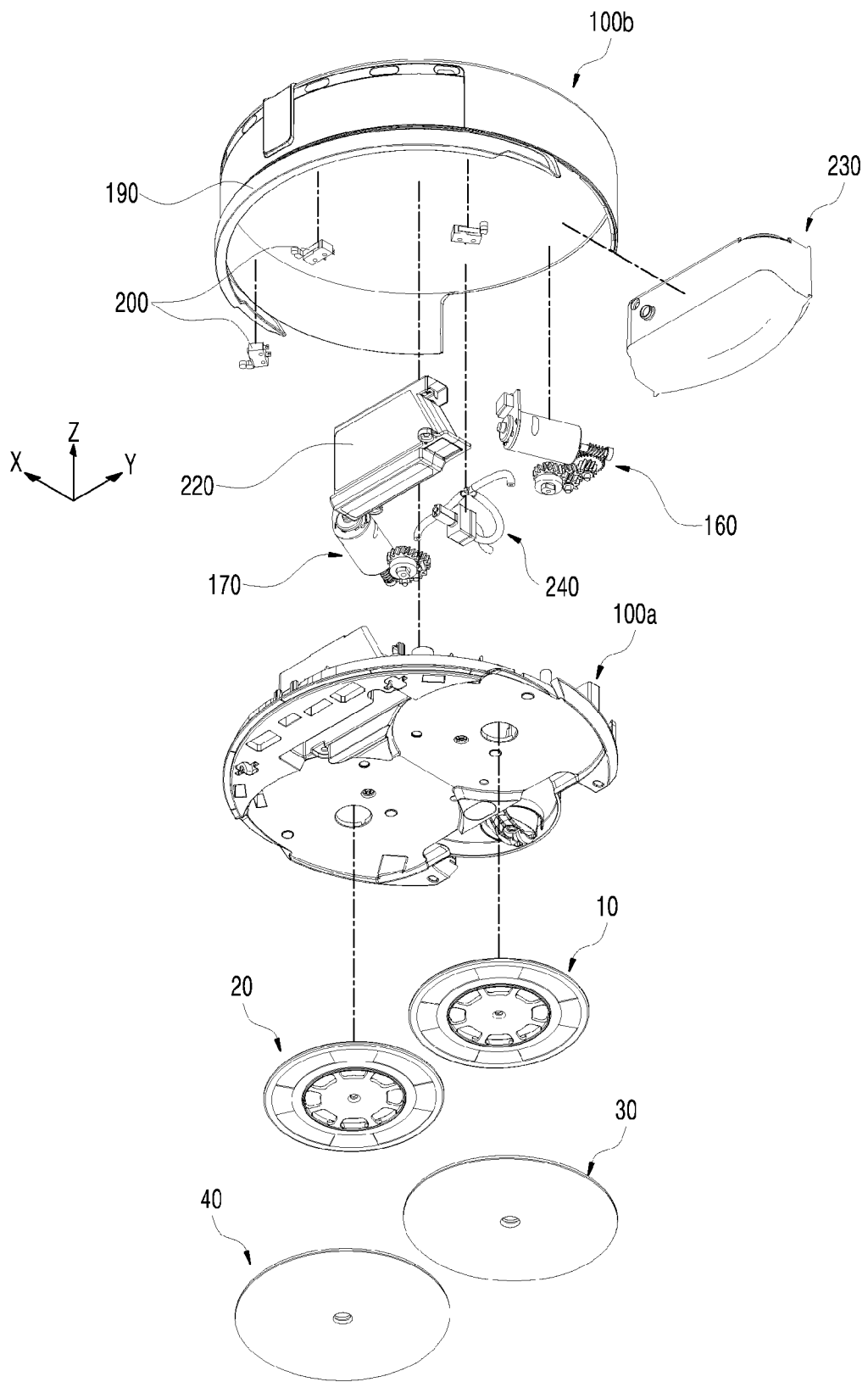
FIG. 6 is an exploded perspective view illustrating the robot cleaner illustrated in FIG. 5.
Figure 7:
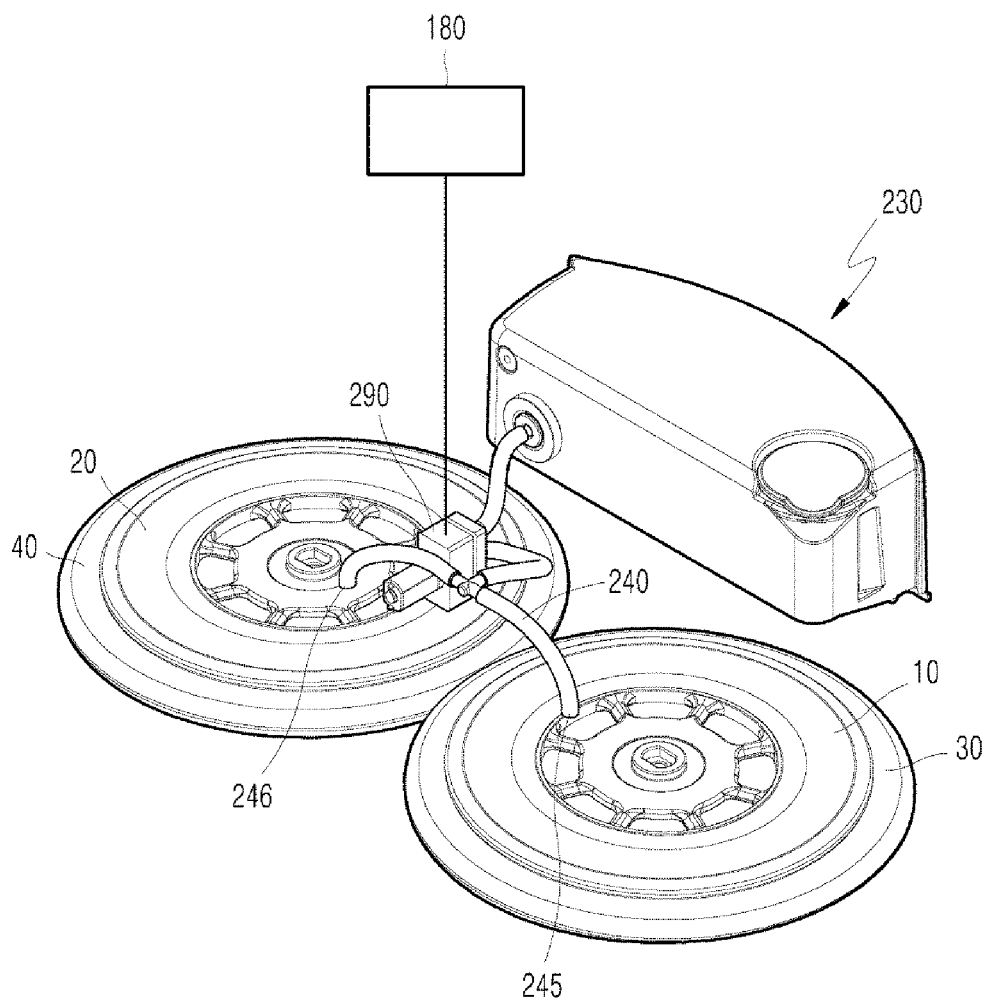
FIG. 7 is a view illustrating only a part of the configuration of the robot cleaner according to an embodiment of the present disclosure, in which the controller is schematically illustrated.

FIG. 5 is a bottom view of the robot cleaner 1 according to an embodiment of the present disclosure, and FIG. 6 is an exploded perspective view illustrating the robot cleaner 1 of FIG. 5. FIG. 7 is a view illustrating certain components included in the robot cleaner 1. Referring to FIGS. 5-7, the robot cleaner 1 according to an embodiment of the present disclosure may include a first actuator 160, a second actuator 170, a battery 220, a water bottle (or water tank) 230, and a water supply tube 240.

The first actuator 160 may be coupled to the body 100 to rotate the first rotating plate 10. The first actuator 160 may include a first case 161, a first motor 162, and one or more first gears 163. The first case 161 may support the other components constituting the first actuator 160, and may be fixedly coupled to the body 100. The first motor 162 may be formed as an electric motor, such as a DC motor driven by the battery 220. The one or more first gears 163 may be engaged with each other to rotate to connect the first motor 162 and the first rotating plate 10 and to transfer the rotational power of the first motor 162 to the first rotating plate 10. For example, the first motor 162 may include a horizontally extending motor shaft, and the one or more first gears 163 may transfer force from the horizontally extending shaft to a vertically extending rotational shaft of the first rotating plate 10 Therefore, the first rotating plate 10 may rotate when the rotation axis of the first motor 162 rotates. Likewise, in the robot cleaner 1 according to an embodiment of the present disclosure, the first mop 30 may rotate due the rotation of the first rotating plate 10 by operation of the first actuator 160.

Similarly, the second actuator 170 may be coupled to the body 100 to rotate the second rotating plate 20. The second actuator 170 may include a second case 171, a second motor 172, and one or more second gears 173. The second case 171 may support the other components constituting the second actuator 170 and may be fixedly coupled to the body 100. The second motor 172 may be formed as an electric motor, such as a DC motor driven by the batter 220. The one or more second gears 173 may engage with each other to rotate to connect the second motor 172 and the second rotating plate 20 and to transfer the rotational power of the second motor 172 to the second rotating plate 20. Therefore, the second rotating plate 20 may rotate when the rotation axis of the second motor 172 rotates. Likewise, in the robot cleaner 1 according to an embodiment of the present disclosure, the second mop 40 may rotate due to the rotation of the second rotating plate 20 by the operation of the second actuator 170.

In an embodiment of the present disclosure, the first actuator 160 may have a center of gravity 165 located inside a vertical region formed by the first rotating plate 10. For example, by positioning the first actuator 160 over the first rotating plate 10, loss of power transmitted from the first actuator 160 to the first rotating plate 10 may be minimized, and by applying a gravitational load of the first actuator 160, which may be relatively heavy, to the first rotating plate 10, the first mop 30 may mop the floor while sufficiently rubbing the floor.

Further, in an embodiment of the present disclosure, the second actuator 170 may have a center of gravity 175 located inside a vertical region formed by the second rotating plate 20. For example, by positioning the second actuator 170 directly over the second rotating plate 20, loss of power transmitted from the second actuator 170 to the second rotating plate 20 may be minimized, and by applying a load of the second actuator 170, which may be relatively heavy, to the second rotating plate 20, the second mop 40 may mop the floor while sufficiently rubbing the floor.

The robot cleaner 1 may be formed to be bilaterally symmetric. For example, the second actuator 170 may be substantially symmetrical with the first actuator 160 with respect to a centerline of the robot cleaner in a front to rear direction.

The battery 220 may be coupled to the body 100 and may supply power to other components of the robot cleaner 1. The battery 220 may supply power to the first actuator 160 and the second actuator 170. For example, the battery 220 may supply power to the first motor 162 and the second motor 172. In an embodiment of the present disclosure, the battery 220 may be charged by an external power source, and for this purpose, one side of the body 100 or the battery 220 itself may include a charging terminal for coupling the battery 220 to the external power source for charging.

In the robot cleaner 1 according to an embodiment of the present disclosure, the battery 220 may be located inside a vertical area of a rectangle (A) having respective vertexes of which corresponding to a vertical center of first rotating plate 10, a vertical center of second rotating plate 20, a vertical center of a first support wheel 120. and a vertical center of a second support wheel 130. For example, the battery 220 may be located in front of a connecting line L1, which is an imaginary line connecting the center of the first rotating plate 10 and the center of the second rotating plate 20 along the horizontal direction (direction parallel to the floor surface B). In the robot cleaner 1 according to an embodiment of the present disclosure, the battery 220 may be coupled to the body 100 such that the longitudinal direction thereof may be parallel to the connecting line L1.

In an embodiment of the present disclosure, the first support wheel 120 and the second support wheel 130 may be spaced apart from each other (e.g., along an imaginary connecting line at a front edge of the rectangle A), and may be made in the form of a conventional wheel. The first support wheel 120 and the second support wheel 130 may move while rolling in contact with the floor, and thus, the cleaner 1 may move along the floor surface B.

The water bottle 230 may be formed as a container having an inner space in which a liquid, such as water, can be received and stored. The water bottle 230 may be fixedly coupled to the body 100, or may be detachably coupled to the body 100. For example, a user may remove the water bottle 230 from the body 100 to fill the water bottle 230 with the liquid. In an embodiment of the present disclosure, the water bottle 230 may be located behind the connecting line L1, and the water bottle 230 may be located above an auxiliary wheel 140.

The water supply tube 240 may be formed as a tube or pipe having a hollow substantially cylindrical form, may be connected to the water bottle 230 such that the liquid in the water bottle 230 may flows through the inside hollow space of the water supply tube 240, and may be provided with injection nozzles 245 and 246. The water supply tube 240 may be formed such that the injection nozzles 245 and 246 may be provided at opposite ends of the water supply tube 240 connected to the water bottle 230 to be positioned above the first and second rotating plates 10 and 20, such that the injection nozzles 245 and 246 may supply the liquid inside the water bottle 230 to the first mop 30 and the second mop 40.

In the robot cleaner 1 according to an embodiment of the present disclosure, the water supply tube 240 may be formed in a shape in which one pipe may be branched into two pipes. The first injection nozzle 245 may be provided at one of the branched ends and may be positioned above the first rotating plate 10. The second injection nozzle 246 may be provided at the other branched end and may be positioned above the second rotating plate 20.

In the robot cleaner 1 according to an embodiment of the present disclosure, in order to move the liquid through the water supply tube 240, a water pump 290 may be provided on the water supply tube 240. For example, the water pump 290 may be provided on a single pipe portion of the water supply tube 240 coupled to the water bottle 230.

The center of gravity of the robot cleaner 1 may be located inside the rectangle A, respective vertexes of which are the center of first rotating plate 10, the center of second rotating plate 20, the center of first support wheel 120, and the center of second support wheel 130. Each of the first actuator 160, the second actuator 170, the battery 220, and the water bottle 230 may be relatively heavy in the robot cleaner 1. In the robot cleaner 1 according to an embodiment of the present disclosure, the first actuator 160 and the second actuator 170 may be located on the connecting line L1 or adjacent to the connecting line L1, the battery 220 may be located in front of the connecting line L1, and the water bottle 230 may be located behind the connecting line L1, so that the overall center of gravity of the robot cleaner 1 may be located at the center of the robot cleaner 1. Accordingly, the first mop 30 and the second mop 40 may be in stable contact with the floor. In addition, since the first actuator 160, the second actuator 170, the battery 220 and the water bottle 230 may be horizontally separated to be located on different areas in the plan view, the robot cleaner 1 may be formed with a relatively flat body 100 such that the robot cleaner 1 may be able to enter relatively low spaces under furniture, such as under a shelf or a table.

In addition, according to the robot cleaner 1 in an embodiment of the present disclosure, when the robot cleaner 1 is initially operated, a significant amount of liquid may be contained in the water bottle 230 and weight may be distributed evenly in the robot cleaner 1 such that cleaning may be performed while only the first mop 30 and the second mop 40 contact the floor. The center of gravity of the robot cleaner 1 may move forward as the liquid inside the water bottle 230 is consumed, the robot cleaner 1 may continue to perform cleaning as the first support wheel 120 and the second support wheel 130 contact the floor to maintain contact between the first mop 30 and the second mop 40 and the floor.

Figure 8:
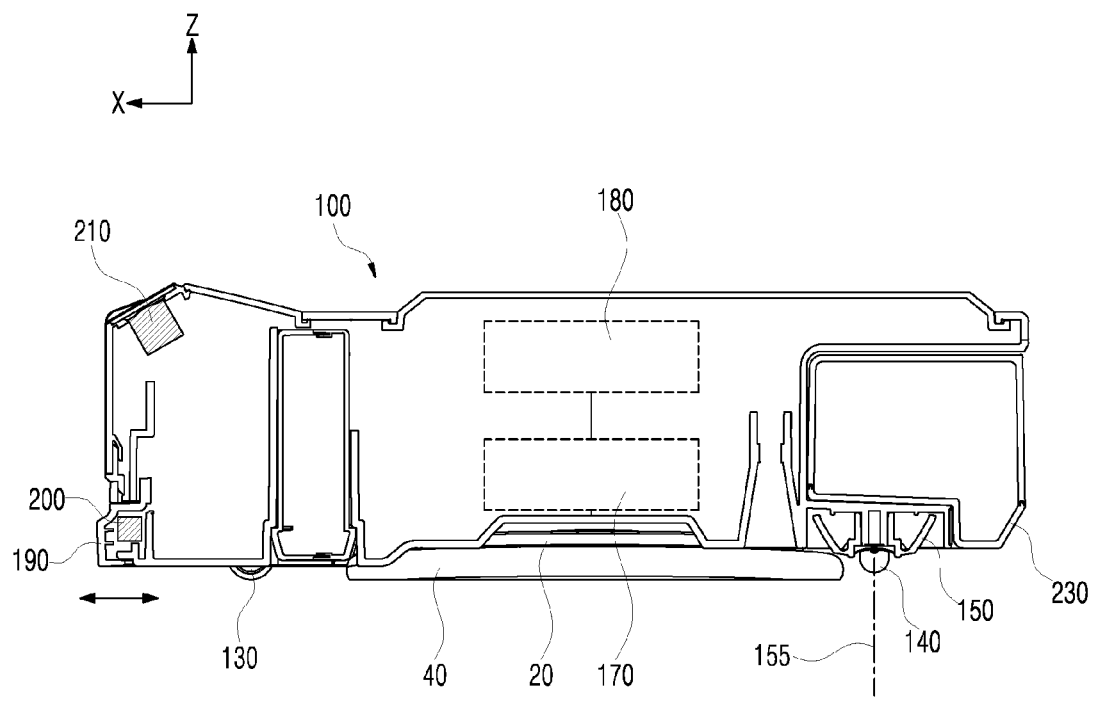
FIG. 8 is a cross-sectional view schematically illustrating a robot cleaner and its components according to an embodiment of the present disclosure.

FIG. 8 is a cross-sectional view schematically illustrating a robot cleaner 1 and its components according to an embodiment of the present disclosure. Referring to FIG. 8, the robot cleaner 1 may include a controller 180, a bumper 190, a first sensor 200, and a second sensor 210. The controller 180 may be configured to manage, for example, the operation of the first actuator 160 and the second actuator 170 according to predetermined information or real time information. The robot cleaner 1 may include a memory or storage medium which stores an application program executed by the controller 180. The controller 180 may be configured to control the robot cleaner 1 by executing the application program according to information inputted to the robot cleaner 1, information outputted from the robot cleaner 1, sensed data, a status of the robot cleaner, and the like.

The bumper 190 may be coupled to the body 100 along the edge thereof, and may be configured to move relative to the body 100. For example, the bumper 190 may be coupled to the body 100 so as to reciprocate in a direction toward the center of the body 100. The bumper 190 may be coupled along a portion of the edge of the body 100, or may be coupled along the entire edge of the body 100. The bumper 190 may be positioned are a front edge of the body 100.

The first sensor 200 may be coupled to the body 100, and may be configured to detect a movement (e.g., a relative movement) of the bumper 190 with respect to the body 100. The robot cleaner 1 may include multiple first sensors 200 to detect a movement of different portions of the bumper 190 with respect to the body 100. The first sensor 200 may be formed using a microswitch, a photo interrupter, a tact switch, or the like.

The controller 180 may control the robot cleaner 1 to avoid an obstacle when the bumper 190 of the robot cleaner 1 comes into contact with the obstacle, such as to control the operation of the first actuator 160 and/or the second actuator 170 to adjust a movement of the robot cleaner 1, according to information obtained by the first sensor 200. For example, when the bumper 190 contacts an obstacle while the robot cleaner 1 is traveling, the position where the bumper 190 contacts may be recognized by the first sensor 200, and the controller 180 may control the operation of the first actuator 160 and/or the second actuator 170 to deviate from the contact position, such as to reverse a travel direction of the robot cleaner to move away from.

The second sensor 210 may be coupled to the body 100, and configured to detect a relative distance from the obstacle. The second sensor 210 may be a distance sensor, such as a sensor that emits an electromagnetic or sound output and detects a reflection of the emissions from the obstacle.

The controller 180 may control the operation of the first actuator 160 and/or the second actuator 170 to change the traveling direction of the robot cleaner 1 or to move the robot cleaner 1 away from an obstacle when the distance between the robot cleaner 1 and the obstacle is less than a predetermined value according to information obtained by the second sensor 210.

Figure 9:
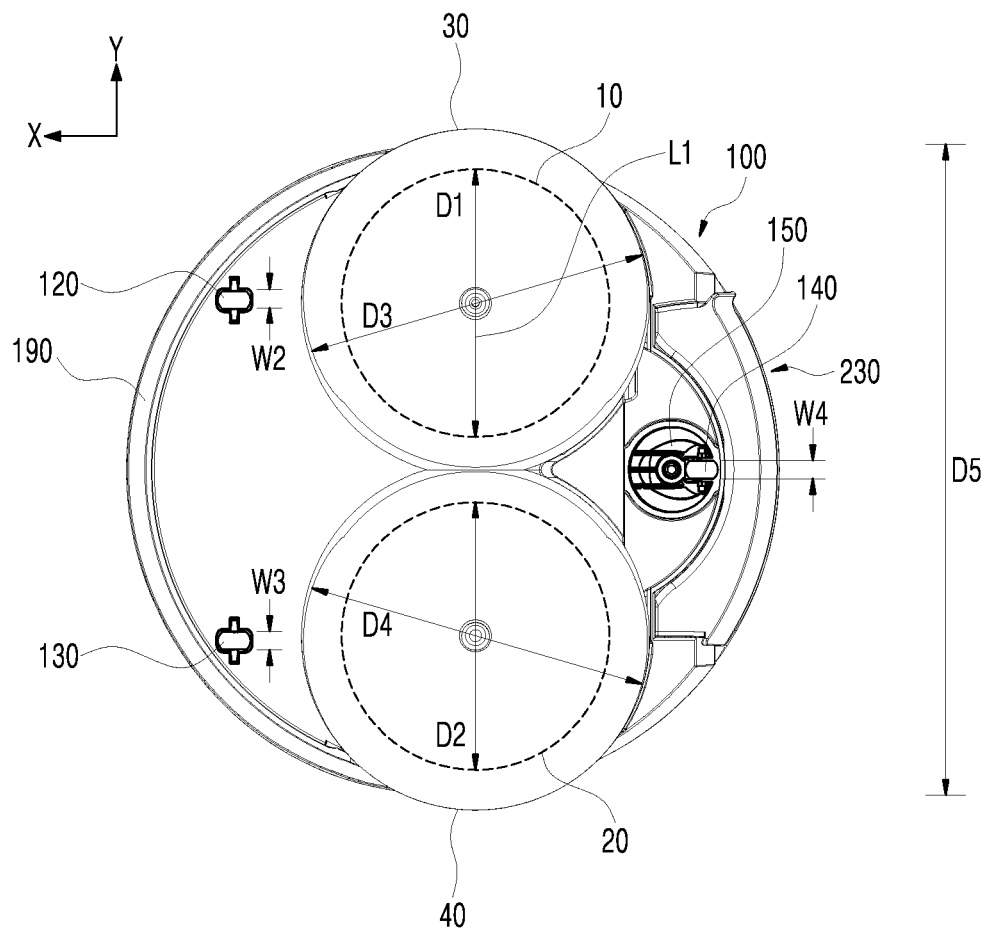
FIG. 9 is a bottom view of the robot cleaner according to an embodiment of the present disclosure.

FIG. 9 is a bottom view of the robot cleaner 1 according to an embodiment of the present disclosure. As described above, the robot cleaner 1 according to an embodiment of the present disclosure may move according to the frictional force between the first mop 30 and the floor surface B, which is generated when the first rotating plate 10 rotates, and the frictional force between the second mop 40 and the floor surface B, which is generated when the second rotating plate 20 rotates.

In the robot cleaner 1 according to an embodiment of the present disclosure, the first support wheel 120 and the second support wheel 130 may be formed and positioned such that the movement of the robot cleaner 1 may be not interfered with by the friction with the floor and no increase in load may be caused when the robot cleaner 1 moves. To this end, a width W2 of the first support wheel 120 and a width W3 of the second support wheel 130 in a horizontal direction may be significantly smaller than a diameter D1 of the first rotating plate 10 or a diameter D2 of the second rotating plate 20.

For example, the width W2 of the first support wheel 120 and the width W3 of the second support wheel 130 may be smaller than 1/10 of the diameter D1 of the first rotating plate 10 or the diameter D2 of the second rotating plate 20. Furthermore, each of the diameter D1 of the first rotating plate 10 and the diameter D2 of the second rotating plate 20 may be greater than 1/3 and smaller than 1/2 of a diameter D5 of the body 100 (e.g., a width of the body 100 in a left to right direction). Each of a diameter D3 of the first mop 30 and a diameter D4 of the second mop 40 may be larger than 1/3 and smaller than 2/3 of the diameter D5 of the body 100. As such, even when the robot cleaner 1 is driven while the first support wheel 120 and the second support wheel 130 are in contact with the floor together with the first mop 30 and the second mop 40, the frictional force between the first support wheel 120 and the floor surface B and the frictional force between the second support wheel 130 and the floor surface B may be significantly smaller than the frictional force between the first mop 30 and the floor surface B and the frictional force between the second mop 40 and the floor surface B, thereby not causing unnecessary power loss and not hindering the movement of the robot cleaner 1.

In the robot cleaner 1 according to an embodiment of the present disclosure, the horizontal distance between the center of the first support wheel 120 and the center of the second support wheel 130 (e.g., a front edge of rectangle A) may be the same as or similar to the horizontal distance between the center of rotation of the first rotating plate 10 and the center of rotation of the second rotating plate 20 (e.g., length L1 corresponding to a rear edge of rectangle A).

When the horizontal distance between the center of the first support wheel 120 and the center of the second support wheel 130 is C1, and the distance between the center of rotation of the first rotating plate 10 and the center of rotation of the second rotating plate 20 is C2, C1 may be greater than 0.8*C2 and less than 1.2*C2. Accordingly, the robot cleaner 1 according to an embodiment of the present disclosure can be stably supported by the first support wheel 120, the second support wheel 130, the first mop 30, and the second mop 40.

In the robot cleaner 1 according to an embodiment of the present disclosure, the rotation axis of the first support wheel 120 and the rotation axis of the second support wheel 130 may be formed in parallel with the connecting line L1. For example, the rotation axis of the first support wheel 120 and the rotation axis of the second support wheel 130 may be fixed (fixed in left and right directions) on the body 100.

The first support wheel 120 and the second support wheel 130 may be in contact with the floor together with the first mop 30 and the second mop 40. At this time, in order to move the robot cleaner 1 in a straight line, the first mop 30 and the second mop 40 may rotate at substantially similar speeds in opposing directions to each other. Herein, the first support wheel 120 and the second support wheel 130 assists in moving the robot cleaner 1 in a straight line in the front and rear direction.

The robot cleaner 1 according to an embodiment of the present disclosure may include an auxiliary wheel body 150. The auxiliary wheel body 150 may be rotatably coupled to the lower side of the body 100, and an auxiliary wheel 140 may be rotatably coupled to the auxiliary wheel body 150. For example, the auxiliary wheel 140 may be coupled to the body 100 via the auxiliary wheel body 150.

The auxiliary wheel 140 may be made in the form of a conventional wheel, and the auxiliary wheel 140 may be positioned to contact the floor during normal operation of the robot cleaner 1. Additionally, the auxiliary wheel 140 may be positioned to contact the floor when the mops 30 and 40 are separated from the rotating plates 10 and 20, such as to prevent the rotating plates 10 and 20 from contacting and damaging the floor surface.

The rotation axis of the auxiliary wheel 140 and the rotation axis of the auxiliary wheel body 150 may be formed to cross each other, and the direction of the rotation axis of the auxiliary wheel 140 and the direction of the rotation axis of the auxiliary wheel body 150 may be substantially perpendicular to each other. For example, a rotation axis 155 of the auxiliary wheel body 150 may be directed in the vertical direction or slightly inclined in the vertical direction, and the rotation axis 145 of the auxiliary wheel 140 may be directed in the horizontal direction.

In the robot cleaner 1 according to an embodiment of the present disclosure, the auxiliary wheel 140 may come into contact with the floor surface B when the robot cleaner 1 is not practically being used for cleaning (e.g., when the first mop 30 and the second mop 40 are separated from the robot cleaner 1). When the robot cleaner 1 enters this state in which the robot cleaner 1 is not practically being used for cleaning, the auxiliary wheel 140 may be directed by the auxiliary wheel body 150 in a direction that may be freely changed by a movement of the auxiliary wheel body 150, and the robot cleaner 1 may be easily moved.

Figure 10:
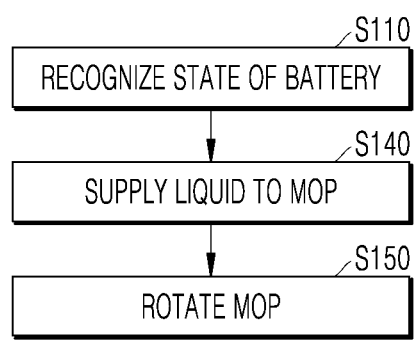
FIG. 10 is a flowchart illustrating a method of controlling a robot cleaner according to an embodiment of the present disclosure.
Figure 11:
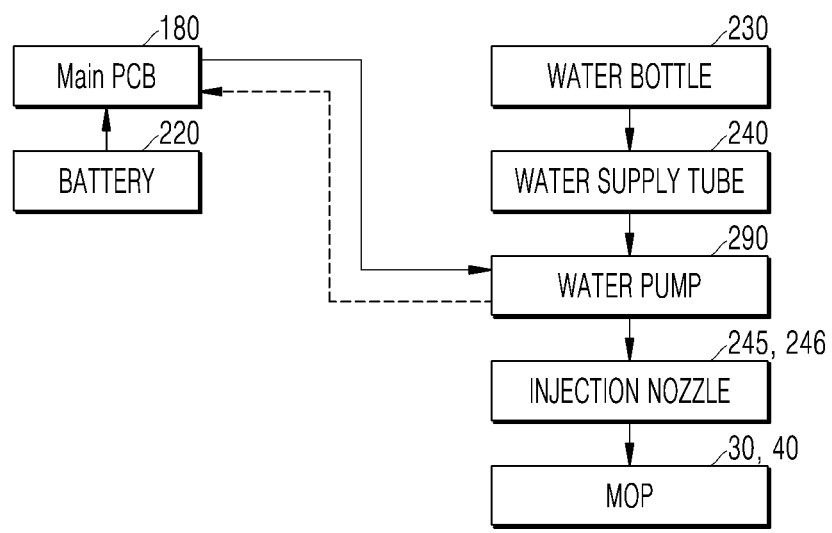
FIG. 11 is a view illustrating the relationship between a battery, a controller, and a water pump in a robot cleaner according to an embodiment of the present disclosure.
Figure 12:
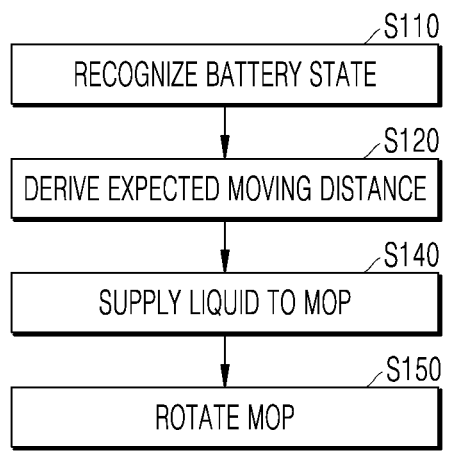
FIG. 12 is a flowchart illustrating a method of controlling a robot cleaner according to an embodiment of the present disclosure.

FIG. 10 is a flowchart illustrating a method of controlling a robot cleaner according to an embodiment of the present disclosure, and FIG. 11 is a view illustrating the relationship between a battery 220, a controller 180, and a water pump 290 in a robot cleaner 1 according to an embodiment of the present disclosure. Referring to FIGS. 10 and 11, the robot cleaner 1 according to an embodiment of the present disclosure may be configured to clean the floor while the first mop 30 and the second mop 40 rotate. In this case, a liquid (for example, water or a cleaning fluid) may be supplied to the first mop 30 and the second mop 40, such that mopping may be performed when the first mop 30 and the second mop 40 are rotated in a dampened state. In the present disclosure, performing mopping with a damp mop may be referred to as a "water supply mode".

The robot cleaner 1 according to an embodiment of the present disclosure may allow dry mopping to be performed without supplying liquid (water) to one or more of the first mop 30 and the second mop 40 when the first mop 30 and the second mop 40 are rotated to clean the floor. In the present disclosure, performing dry mopping may be referred to as a "normal mode".

The robot cleaner 1 according to an embodiment of the present disclosure can be operated in the water supply mode or the normal mode, and hereinafter, operating in the water supply mode will be described. The method of controlling a robot cleaner according to an embodiment of the present disclosure may include determining a state of the battery 220 (S110), supplying the liquid of the water bottle 230 to the first and second mops 30 and 40 (S140), and supplying power to the actuators 160 and 170 to rotate the mops 30 and 40 (S150).

According to the robot cleaner 1 in an embodiment of the present disclosure, a method of controlling the robot cleaner 1 may include controlling the supply of the liquid from the water bottle 230 to the mops 30 and 40, and the supply of the liquid may be controlled according to the state of the battery. The controlling the supply of the liquid may include one or more of controlling a supply amount per unit time, a supply time, or a supply interval when the liquid from the water bottle 230 is supplied to the mops 30, 40, and controlling the supply of the liquid from the water bottle 230 may include controlling the operation of the water pump 290. In an embodiment of the present disclosure, by controlling the water pump 290 by the control unit 180, the supply amount per unit time of the liquid supplied from the water bottle 230 to the mops 30 and 40 can be controlled, the total supply time of the liquid can be controlled, and/or the supply interval of the liquid can be controlled.

The state of the battery 220 may include, for example, one or more of a capacity of the battery 220, an expected use time of the battery 220, a voltage of the battery 220, and/or a charge rate of the battery 220. In the method of controlling a robot cleaner 1, an expected use time of the battery 220 may be derived in step S110. The expected use time of the robot cleaner 1 may be calculated according to the state of the battery 220, and the expected use time of the robot cleaner 1 may be experimentally derived. Furthermore, one or more the amount of supply per unit time, the supply time, or the supply interval of the liquid from the water bottle 230 to the mops 30 and 40 may be adjusted in consideration of the expected use time of the robot cleaner 1, and a expected time when the liquid stored in the water bottle 230 is exhausted may be controlled to match the expected use time of the robot cleaner 1 corresponding to the battery state.

For example, when the expected use time of the battery 220 is t1, the supplying the liquid stored in the water bottle 230 may be controlled such that the liquid may be exhausted in a time range between 0.9*t1 and t1 from the time point when the operation of the robot cleaner 1 started. For instance, if the capacity of the battery 220 is 5000 mAh and the battery 220 is fully charged (e.g., storing 5000 mAh), an expected use time of the robot cleaner 1 may be estimated to be 100 minutes based on prior uses, testing, average battery output, etc. The water pump 290 may be controlled such that the water stored in the water bottle 230 may be exhausted at a time point to substantially match the expected use time of 100 minutes (e.g., liquid is supplied for a duration of 90 minutes to 100 minutes).

For example, the supply of the liquid in the robot cleaner 1 may be controlled according to an amount of liquid consumption per rotation of the mops 30 and 40, and the amount of liquid stored in the water bottle 230. As used herein, the amount of liquid consumption may correspond to an amount of liquid that is absorbed by the mops 30 and 40 and then leaves the mops 30 and 40. The amount of liquid consumption may include an amount of liquid delivered from the mops 30 and 40 to the floor, and may also include an amount of liquid evaporated from the mops 30 and 40. The amount of liquid consumption per rotation of the mops 30 and 40 can be measured experimentally, and the liquid consumption may vary, for instance, based on characteristics of the mops 30 and 40 such as the type of material used, a thickness of the material, or how clean the mops 30 and 40 are, and may further vary based on characteristics of the floor to be cleaned, such as whether the floor is absorbent and a smoothness of the floor. In order to determine an amount of liquid stored in the water bottle 230, the robot cleaner 1 may include a water level sensor.

In the robot cleaner 1 according to an embodiment of the present disclosure, the expected use time may be derived according to the state of the battery 220, and the liquid supply amount per unit time or the liquid supply interval may be adjusted in consideration of the amount of liquid consumption per rotation of the mops 30 and 40. Accordingly, the liquid stored in the water bottle 230 may be controlled such that the liquid may be exhausted according to the expected use time.

As shown in FIG. 10, a method of controlling a robot cleaner according to an embodiment of the present disclosure may include deriving an expected moving distance of the robot cleaner 1 according to the state of the battery 220 (S120). The robot cleaner 1 according to an embodiment of the present disclosure may be made to move by the rotation of the first mop 30 and the second mop 40. The relationship between the state of the battery 220 and the expected moving distance of the robot cleaner 1 may be calculated.

The relationship between the state of the battery 220 and the expected moving distance of the robot cleaner 1 may be calculated experimentally. Here, the expected moving distance may be calculated differently depending on characteristics of the first mop 30 and the second mop 40, the angle (camber angle) between the bottom surfaces of the first mop 30 and the second mop 40 and the floor surface, characteristics of the floor to be cleaned, and a degree of sliding of the mops 30 and 40 on the floor.

In the robot cleaner 1 according to an embodiment of the present disclosure, the first mop 30 and the second mop 40 may rotate at a constant rotation speed, or may rotate at a variable speed. When the first mop 30 and the second mop 40 rotate at a constant rotation speed, the expected moving distance of the robot cleaner 1 may be calculated depending on the state of the battery 220, and when the rotation speeds of the first mop 30 and the second mop 40 are variable, the expected moving distance of the robot cleaner 1 may be calculated depending on the state of the battery 220 and the rotation speed of the first and second mops 30 and 40.

As such, in the robot cleaner 1 according to an embodiment of the present disclosure, the controller 180 may derive an expected moving distance of the robot cleaner 1 according to the state of the battery 220. For example, if the battery 220 has a capacity of 5000 mAh when the battery 220 is fully charged, the expected moving distance of the robot cleaner 1 may be determined to be 100 m. The supply of the liquid described in the robot cleaner 1 may be controlled according to the expected moving distance of the robot cleaner 1, the amount of liquid consumption per moving distance of the robot cleaner 1, and the amount of liquid stored in the water bottle 230.

For example, the amount of liquid consumption per moving distance of the robot cleaner 1 can be measured experimentally, and the liquid consumption may vary according to the characteristics of the first mop 30 and the second mop 40 used, the angle (camber angle) between the bottom surface of the first mop 30 and the second mop 40 and the floor surface, and the characteristics of the floor to be cleaned. In the robot cleaner 1 according to an embodiment of the present disclosure, the expected use time may be derived according to the state of the battery 220, and the amount of liquid supplied per unit time can be adjusted in consideration of the expected moving distance of the robot cleaner 1 and the amount of liquid consumption per moving distance of the robot cleaner 1.

Figure 13:
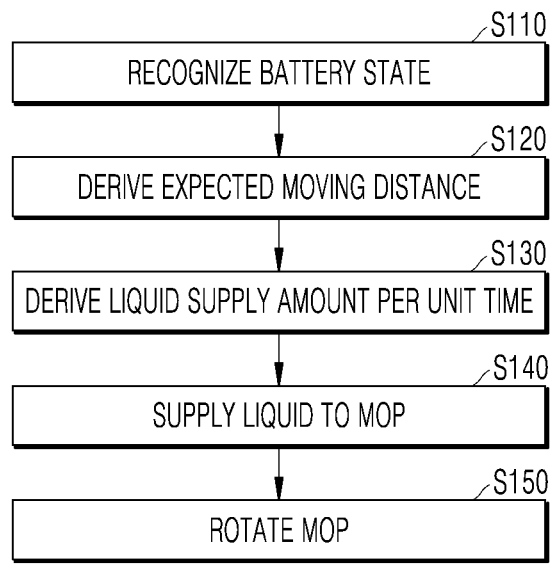
FIG. 13 is a flowchart illustrating a method of controlling a robot cleaner according to an embodiment of the present disclosure.

A shown in FIG. 13, a method of controlling a robot cleaner according to an embodiment of the present disclosure may include determining a supply amount of liquid per unit time (S130). For example, the method of controlling a robot cleaner according to an embodiment of the present disclosure may include recognizing the liquid supply amount per unit time according to the operation of the water pump 290 (S130).

The supply of the liquid in the robot cleaner 1 may be controlled according to the expected moving distance of the robot cleaner 1, the amount of liquid consumption per moving distance of the robot cleaner 1, the amount of liquid stored in the water bottle 230, and the liquid injection amount per unit time based on the performance of the water pump 290. The liquid injection amount per unit time based on the performance of the water pump 290 can be immediately confirmed according to the performance of the water pump 290. In the robot cleaner 1, the operation time or the operation interval of the water pump 290 may be controlled.

For example, when the liquid injection amount per unit time according to the performance of the water pump 290 is 1000 ml/min (or 16 and ⅔ ml/sec), and the supply amount of liquid required per unit time is 50 ml/min to achieve the desired duration that the liquid is supplied, the water pump 290 may be controlled such to have an operating time of 3 seconds per minute (e.g., such that water pump 290 outputs a total of 50 ml of liquid per minute).

In the robot cleaner 1 according to an embodiment of the present disclosure, the amount of liquid supplied per unit time can be adjusted in consideration of the expected use time according to the state of the battery 220, the expected moving distance of the robot cleaner 1, and the amount of liquid consumption per moving distance of the robot cleaner 1. Further, it may be possible to control the operation of the water pump 290 according to the required amount of supply per unit time. Accordingly, the liquid stored in the water bottle 230 may be controlled such that the liquid is exhausted according to the expected use time.

For example, in a hypothetical robot cleaner 1, the controller 180 may derive the supply amount per unit time of liquid as 50 ml/min in the case in which the expected use time according to the state of the battery 220 is 100 minutes, the expected moving distance of the robot cleaner 1 is 100 m, and the amount of liquid consumption per moving distance 50 ml/m. The controller 180 may control the water pump 290 to have an operating time of 3 seconds per minute when the liquid injection amount per unit time according to the performance of the water pump 290 is 1000 ml/min.

Figure 14:
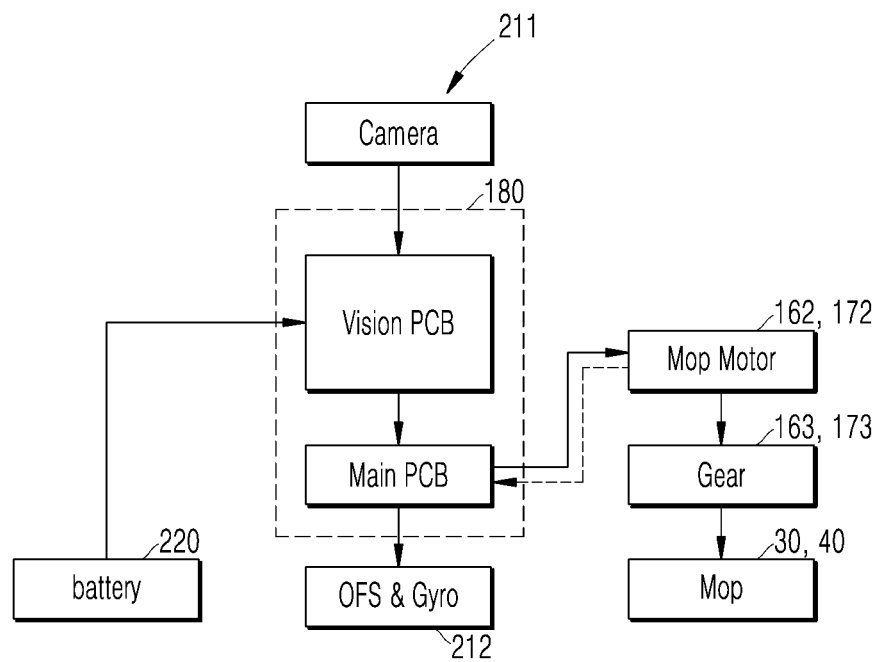
FIG. 14 is a view illustrating the relationship between a battery, a controller, an actuator, and a mop in a robot cleaner according to an embodiment of the present disclosure.

FIG. 14 is a view showing the relationship between a battery 220, a controller 180, actuators 160 and 170, and mops 30 and 40 in a robot cleaner 1 according to an embodiment of the present disclosure. In the process of operating the robot cleaner 1 in the water supply mode, the actual moving distance of the robot cleaner 1 can be detected, and the rotation speeds of the mops 30 and 40 may be adjusted accordingly. In order to detect the actual moving distance of the robot cleaner 1, a movement detection sensor 212 may be provided.

The movement detection sensor 212 may include one or more of an optical flow sensor (OFS), an acceleration sensor, a gravity sensor (G-sensor), and/or a gyroscope sensor. An optical flow sensor (OFS) 136 may include a sensor that can measure the traveling distance of the robot cleaner 1 on various floors and a wheelspin phenomenon when the robot cleaner 1 is traveling.

In addition, the robot cleaner 1 according to an embodiment of the present disclosure may include a camera 211 in order to detect the actual moving distance of the robot cleaner 1. In the controller 180 according to an embodiment of the present disclosure, the actual moving distance of the robot cleaner 1 may be recognized by the movement detection sensor 212 and the camera 211. The controller 180 may control the first actuator 160 and the second actuator 170 to cause the actual moving distance and the expected moving distance to coincide with each other or correspond to each other within a predetermined error value, and can control the first motor 162 and the second motor 172 accordingly.

Figure 15A:
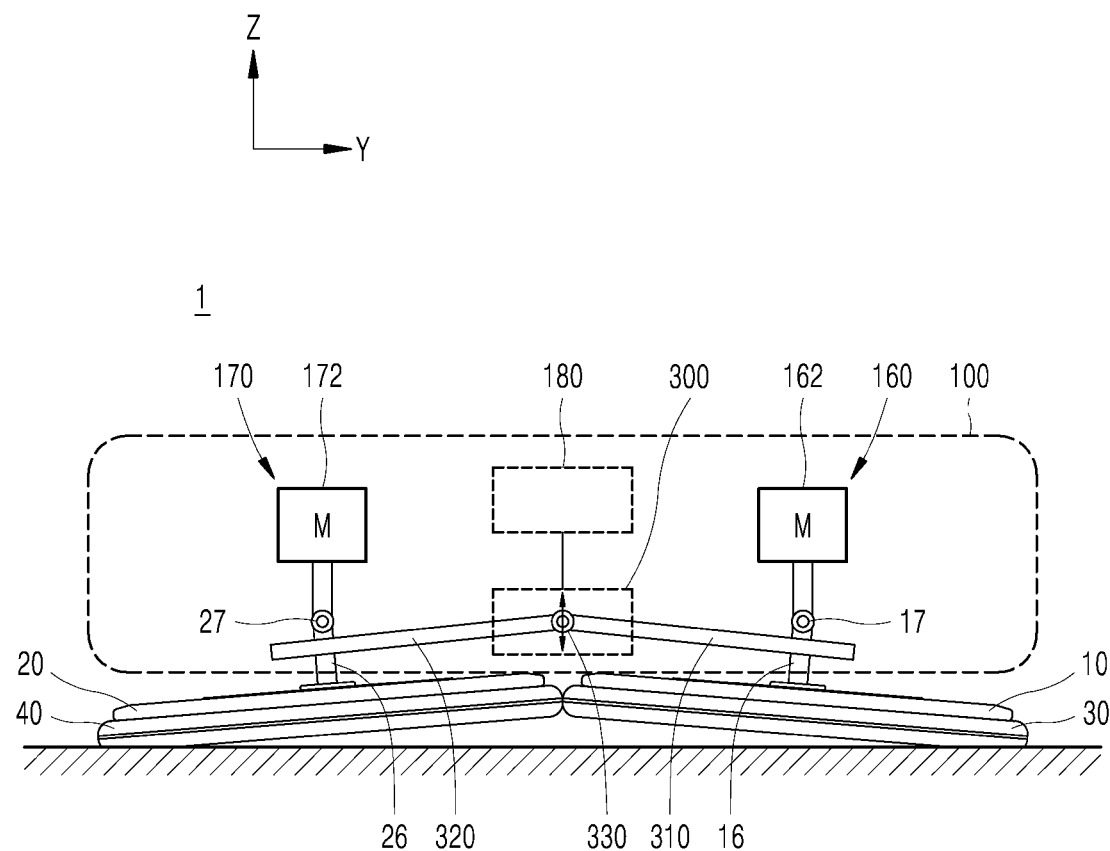
FIG. 15A is a schematic diagram illustrating components for variation of the rotation axis of a first mop and the rotation axis of a second mop in a robot cleaner according to an embodiment of the present disclosure.
Figure 15B:
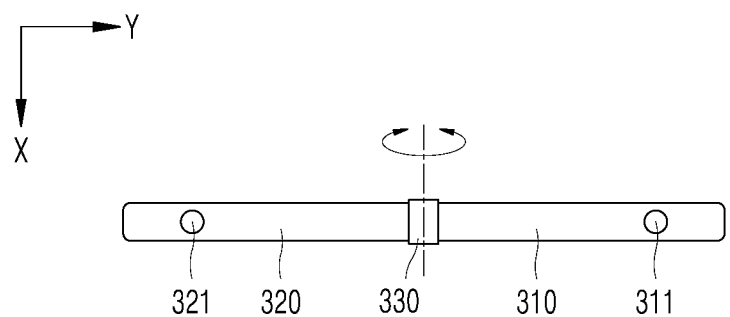
FIG. 15B is a view from above of a first movable plate and a second movable plate illustrated in FIG. 15A.
Figure 16:
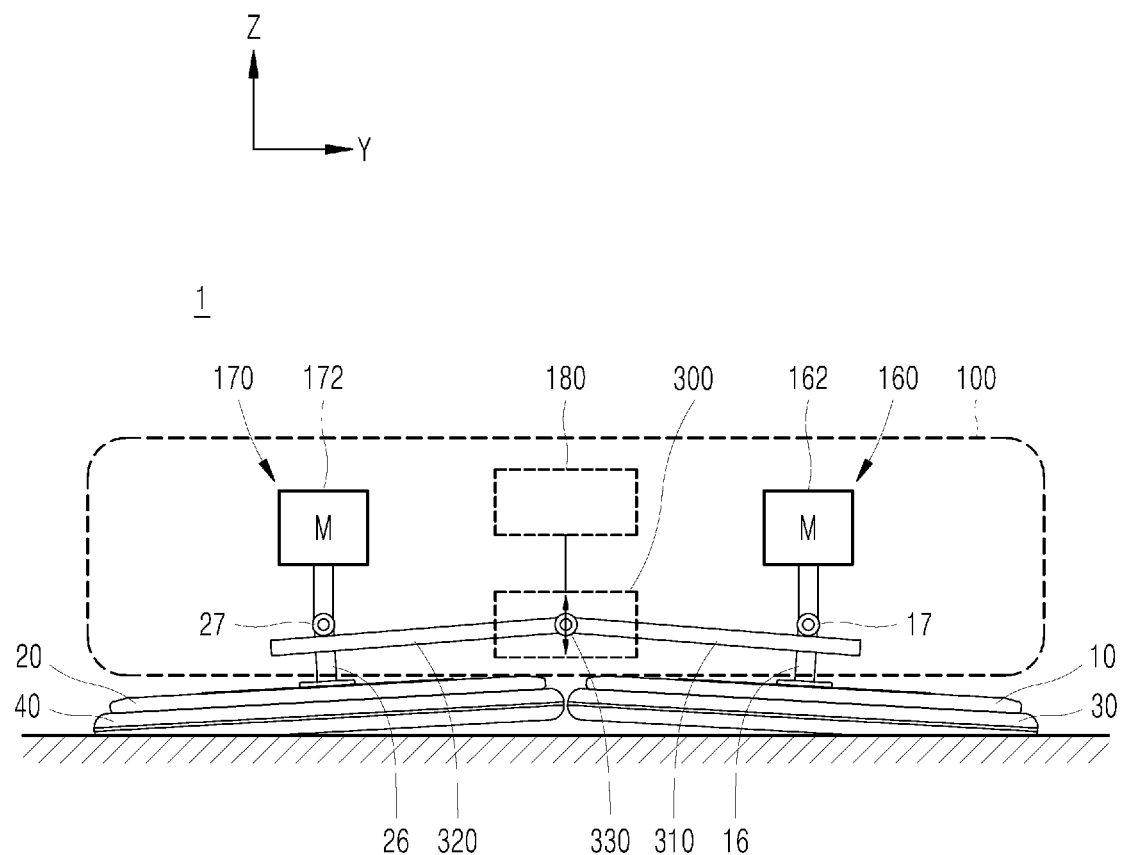
FIG. 16 is a view schematically illustrating a state in which the first mop and the second mop are varied in FIG. 15A.

FIG. 15A is a schematic diagram illustrating components for variation of the rotation axis of a first mop 30 and the rotation axis of a second mop 40 in a robot cleaner 1 according to an embodiment of the present disclosure, and FIG. 15B is a view from above of a first movable plate 310 and a second movable plate 320 illustrated in FIG. 15A. FIG. 16 is schematically illustrates a state in which the first mop 30 and the second mop 40 are varied in FIG. 15A. As shown in FIGS. 15A, 15B, and 16, the robot cleaner 1 according to an embodiment of the present disclosure may be configured to adjust an angle between the rotation axis of the first mop 30 and the floor and an angle between the rotation axis of the second mop 40 and the floor.

To this end, the rotation axis of the first mop 30 and the second mop 40 may be made to have variable positions relative to the body 100, and the robot cleaner 1 according to an embodiment of the present disclosure may include an angle adjusting device 300. A first shaft 16 constituting the rotation axis of the first rotating plate 10 may form the rotation axis of the first mop 30, and the first shaft 16 may be variably connected to the rotation shaft of the first actuator 160. For example, the first shaft 16 may be connected to the rotation shaft of the first actuator 160 and a universal joint 17.

A second shaft 26 constituting the rotation axis of the second rotating plate 20 may form the rotation axis of the second mop 40, and the second shaft 26 may be variably connected to the rotation shaft of the second actuator 170. For example, the second shaft 26 may be connected to the rotation shaft of the second actuator 170 and a universal joint 27.

The angle adjusting device 300 may be operated by the controller 180, may change the angle of the first shaft 16 with respect to the body 100, and may change the angle of the second shaft 26 with respect to the body 100. To this end, the angle adjusting device 300 may include a first movable plate 310 and a second movable plate 320. The first movable plate 310 and the second movable plate 320 may be rotatably coupled to each other, and a portion (or a hinge) 330 corresponding to portions of the first movable plate 310 and the second movable plate 320 that are coupled to each other may be lifted and lowered.

The first movable plate 310 may include a first movable hole 311 which is a through hole, and the first shaft 16 may be inserted into the first movable hole 311. The second movable plate 320 may include a second movable hole 321 which is a through hole, and the second shaft 16 may be inserted into the second movable hole 311.

Accordingly, when the portion 330 to which the first movable plate 310 and the second movable plate 320 are coupled by the angle adjusting device 300 is lifted, the inclination degree of the first shaft 16 may be changed by the first movable plate 310, and the inclination degree of the second shaft 26 may be changed by the second movable plate 320. Accordingly, the angle between the rotation axis of the first mop 30 and the rotation axis of the second mop 40 can be adjusted.

When the angle between the rotation axis of the first mop 30 and the floor is changed, the area in contact with the floor of the first mop 30 may be changed, the moving distance of the robot cleaner 1 according to the rotation speed of the first mop 30 may be changed, and the liquid consumption amount per rotation of the first mop 30 may be changed. Similarly, when the angle between the rotation axis of the second mop 40 and the floor is changed, the area in contact with the floor of the second mop 40 may be changed, the moving distance of the robot cleaner 1 according to the rotation speed of the second mop 40 may be changed, and the liquid consumption amount per rotation of the second mop 40 may be changed. Therefore, the moisture content of the first mop 30 and the moisture content of the second mop 40 can be adjusted, and even when the supply of liquid to the mops 30 and 40 by the water pump 290 is made according to a time interval, efficient mop cleaning can be performed by keeping the moisture content of the mops 30 and 40 in a predetermined range in the cleaning process.

An aspect of the present disclosure provides a robot cleaner capable of performing a steady wet mopping during a cleaning process according to an expected use time of the robot cleaner, and a method of controlling the robot cleaner. Another aspect of the present disclosure is to provide a robot cleaner and a method for controlling the robot cleaner, in which water contained in a water bottle can be exhausted in accordance with a maximum use time of the battery. Another aspect of the present disclosure is to provide a robot cleaner capable of efficient mop cleaning by adjusting the moisture content of the mop, and a method of controlling the robot cleaner.

A robot cleaner according to an embodiment of the present disclosure may include a body, a mop, an actuator, a battery, a water bottle, and a controller. The robot cleaner according to an embodiment of the present disclosure may include a water supply tube and a water pump.

The mop is rotatably coupled to the body to wipe the floor. The mop may be divided into a first mop and a second mop. The actuator is configured to rotate the mop. The actuator may be divided into a first actuator and a second actuator.

The robot cleaner according to an embodiment of the present disclosure may include a first rotating plate and a second rotating plate. The robot cleaner according to an embodiment of the present disclosure may be configured to move by itself even when no external force is applied. For example, the robot cleaner according to an embodiment of the present disclosure may be configured to move like a conventional robot cleaner. The body may form the overall appearance of the robot cleaner, or may be formed as a frame in which other components of the robot cleaner are combined.

Each of the first and second rotating plates are rotatably coupled to the body. The first rotating plate may be coupled to the lower side of the body, and the second rotating plate may also be coupled to the lower side of the body. The first mop may be detachably attached to the bottom surface of the first rotating plate and may be coupled to the first rotating plate to rotate together with the first rotating plate. The second mop may be detachably attached to the bottom surface of the second rotating plate, and may be coupled to the second rotating plate to rotate together with the second rotating plate.

The water bottle may be formed in the form of a container such that a liquid may be stored therein, and may be coupled to the body. The water supply tube may be in the form of a tube or a pipe, and may be connected to the water bottle and provided with an injection nozzle so as to supply the liquid inside the water bottle to the first and second mops. The water pump may be formed on the water supply tube, and the liquid inside the water bottle may be supplied to the first mop and the second mop through the injection nozzle.

The battery may be configured to supply power to the actuator and the water pump. The controller may be configured to control a degree of supply of the liquid supplied from the water bottle to the mop.

In the robot cleaner according to an embodiment of the present disclosure, the degree of supply may be controlled according to the state of the battery. In the robot cleaner according to an embodiment of the present disclosure, the operation of the robot cleaner may be controlled according to the state of the battery. In the robot cleaner according to an embodiment of the present disclosure, when the expected use time of the battery is t1, the liquid inside the water bottle may be controlled such that the liquid is exhausted in a time duration range between 0.911 and t1 from the time point when the operation of the robot cleaner started.

The degree of supply may be any one or more of a supply amount per unit time, a supply time, and a supply interval of the liquid supplied from the water bottle to the mop. The state of the battery may be any one or more of a capacity (battery capacity), an expected use time, a voltage, and a charge rate. The degree of supply may be controlled by controlling the operation of the water pump. The degree of supply may be controlled according to an amount of liquid consumption per rotation of the mop and an amount of liquid stored in the water bottle, The robot cleaner according to an embodiment of the present disclosure may be configured to move by the rotation of the first mop and the second mop. In the robot cleaner according to an embodiment of the present disclosure, the controller may be configured to recognize an expected moving distance according to the state of the battery, and the degree of supply may be controlled according to the expected moving distance, an amount of liquid consumption per moving distance of the robot cleaner, and the amount of liquid stored in the water bottle.

The degree of supply may be controlled according to the amount of liquid consumption per moving distance of the robot cleaner, the amount of liquid stored in the water bottle, and a liquid injection amount per unit time based on performance of the water pump. The controller may be configured to derive an expected use time of the battery. The degree of supply may be controlled according to the supply amount per unit time of the liquid according to the expected use time. The controller may adjust an angle between a rotation axis of the first mop and the floor and an angle between a rotation axis of the second mop and the floor.

A method of controlling a robot cleaner according to an embodiment of the present disclosure may include determining a state of a battery. Further, the method may include supplying liquid of a water bottle to a mop. In addition, the method may include supplying power to an actuator to rotate the mop.

In the supplying of liquid of the water bottle to the mop, the supply of liquid may be adjusted according to a state of the battery. The supply of the liquid in the supplying of liquid of the water bottle to the mop may be adjusted according to an amount of liquid consumption per rotation of the mop and an amount of liquid stored in the water bottle. The method of controlling a robot cleaner according to an embodiment of the present disclosure may include deriving an expected moving distance of the robot cleaner according to the state of the battery.

The supply of liquid in the supplying of liquid of the water bottle to the mop may be adjusted according to the expected moving distance, an amount of liquid consumption per moving distance of the robot cleaner, and the amount of liquid stored in the water bottle.

The supply of liquid in the supplying of liquid of the water bottle to the mop may be adjusted according to the expected moving distance, the amount of liquid consumption per moving distance of the robot cleaner, the amount of liquid stored in the water bottle, and a liquid injection amount per unit time based on performance of the water pump. The method of controlling a robot cleaner of the robot cleaner according to an embodiment of the present disclosure may include calculating an expected use time of the battery.

In addition, the method of controlling a robot cleaner may include recognizing a liquid supply amount per unit time of the liquid. The supply of liquid in the supplying of liquid of the water bottle to the mop may be adjusted according to the expected use time and the liquid supply amount per unit time.

In the supplying of liquid of the water bottle to the mop, the supply of liquid may be adjusted according to operation of the water pump. The method of controlling a robot cleaner according to an embodiment of the present disclosure may include recognizing the liquid supply amount per unit time according to the operation of the water pump. The supply of liquid in the supplying of liquid of the water bottle to the mop may be adjusted according to the expected use time and the liquid supply amount per unit time.

According to the robot cleaner and the method of controlling the robot cleaner according to embodiments of the present disclosure, the degree of supply of liquid to the mop may be controlled according to the state of the battery. The degree of supply may be any one or more of a supply amount per unit time, a supply time, and a supply interval of the liquid supplied from the water bottle to the mop. Further, the state of the battery may be one or more of a battery capacity, an expected use time, voltage, and a charge rate. Accordingly, the supply of the liquid in the cleaning process according to the expected use time of the robot cleaner can be made uniform, and steady mopping can be performed.

According to an embodiments of the present disclosure, since the expected use time of the battery can be calculated while supplying the liquid to the mop according to the amount liquid consumption per moving distance of the robot cleaner or the amount of liquid consumption per rotation of the mop, the robot cleaner may be controlled such that the water contained in the water bottle is exhausted in accordance with the maximum use time of the battery.

According to embodiments of the present disclosure, the supply of the liquid according to the operation of the water pump can be made at predetermined intervals, and the angle between the rotation axis of the first mop and the rotation axis of the second mop and the floor can be adjusted. Accordingly, according to the robot cleaner and the method of controlling the robot cleaner according to the present disclosure, the liquid consumption amount per moving distance of the robot cleaner or the liquid consumption amount per rotation of the first mop/second mop can be adjusted, and efficient mopping can be performed by maintaining the moisture content of the mop.

In certain examples, a robot cleaner is provided and comprises: a body; a mop rotatably coupled to the body to wipe a floor; an actuator configured to rotate the mop; a battery configured to supply power to the actuator; a tank configured to store liquid; and a controller configured to manage delivery of the liquid from the tank to the mop, wherein the controller manages the delivery of the liquid according to a state of the battery.

The robot cleaner has an expected use time (t1) based on the state of the battery, and the controller manages the delivery of the liquid from the tank such that the liquid is exhausted in a range of times between 0.9*t1 and t1 from a time point when an operation of the robot cleaner is started. The controller, when managing the delivery of the liquid, is further to manage at least one of a supply amount per unit time, a supply time, or a supply interval of the liquid from the tank to the mop. The state of the battery includes one or more of a capacity, an expected use time, a voltage, or a charge rate.

The robot cleaner may further comprise: a supply tube connected to the tank and having an injection nozzle configured to supply the liquid in the tank to the mop; and a pump provided on the supply tube. The controller, when managing the delivery of the liquid, may further to manage operation of the pump. The mop may include a first mop and a second mop configured to contact and wipe the floor, and the robot cleaner may be configured to move by rotation of the first mop and the second mop. The controller may determine an expected moving distance for the robot cleaner according to the state of the battery, and the controller may manage the delivery of the liquid from the tank based on the expected moving distance, an amount of liquid consumption per moving distance of the robot cleaner, an amount of the liquid stored in the tank, and a liquid injection amount per unit time of the pump. The controller may further to manage the delivery of the liquid from the tank according to an amount of liquid consumption per rotation of the mop and an amount of the liquid stored in the tank.

The mop may include a first mop and a second mop configured to contact and wipe the floor, the robot cleaner may be configured to move by rotation of the first mop and the second mop, the controller may determine an expected moving distance according to the state of the battery, and the controller may further manage the delivery of the liquid according to the expected moving distance, an amount of liquid consumption per moving distance of the robot cleaner, and an amount of the liquid stored in the tank.

The controller may derive an expected use time of the battery, and manage the delivery of the liquid according to a supply amount per unit time of the liquid and the expected use time. The mop may include a first mop and a second mop configured to wipe the floor, and the controller may further adjust a first angle between a rotation axis of the first mop and the floor and a second angle between a rotation axis of the second mop and the floor.

In another example, a robot cleaner may comprise: a body; a mop rotatably coupled to the body to wipe a floor; an actuator configured to rotate the mop; a tank configured to store liquid; a tube connected to the tank and including an injection nozzle to output the liquid from the tank to the mop; a pump provided on the tube; and a battery configured to supply power to the actuator and the pump, wherein the pump is controlled according to a state of the battery.

The battery may have an expected use time (t1), and the pump may be controlled such that the liquid in the tank is exhausted in a time duration in a range between 0.9*t1 and t1 from a time point when operation of the robot cleaner is started. The state of the battery includes one or more of a capacity, an expected use time, a voltage, or a charge rate of the battery.

In another example, a method of controlling a robot cleaner having a mop configured to be rotated and wipe a floor, an actuator configured to rotate the mop, a tank configured to store liquid that is supplied to the mop, and a battery configured to supply power to the actuator is provided, and the method comprises: identifying a state of the battery; supplying the liquid from the tank to the mop; and supplying power to the actuator to rotate the mop, wherein the supplying of the liquid from the tank to the mop is adjusted according to the state of the battery.

The supplying of the liquid from the tank to the mop may be adjusted according to an amount of liquid consumption per rotation of the mop and an amount of the liquid stored in the tank. The mop may include a first mop and a second mop configured to wipe the floor by surface contact, the robot cleaner may be configured to move by rotation of the first mop and the second mop, the method may further comprise determining an expected moving distance of the robot cleaner based on the state of the battery, and the supplying of the liquid from the tank to the mop may be adjusted based on the expected moving distance, an amount of liquid consumption per moving distance of the robot cleaner, and an amount of the liquid stored in the tank.

The mop may include a first mop and a second mop configured to wipe the floor by surface contact, the robot cleaner may include a pump configured to supply the liquid in the tank to the mop, the robot cleaner may be configured to move by rotation of the first mop and the second mop, and the method may further comprise determining an expected moving distance of the robot cleaner based on the state of the battery, and adjusting the supplying of the liquid from the tank to the mop is according to the expected moving distance, an amount of liquid consumption per moving distance of the robot cleaner, an amount of the liquid stored in the tank, and an liquid injection amount per unit time by the pump.

The method may further comprise identifying an expected use time of the battery; and determining an amount of the liquid supplied per unit time, wherein the supplying of the liquid from the tank to the mop is adjusted according to the expected use time and the amount of the liquid supplied per unit time.

The robot cleaner may include a pump configured to supply the liquid from the tank to the mop, the supplying of the liquid from the tank to the mop may be adjusted based on adjusting operation of the pump. The robot cleaner may include a pump configured to supply the liquid from the tank to the mop, the method may further comprise: determining an expected use time of the battery; and identifying a liquid supply amount per unit time associated with the pump, and the supplying of the liquid from the tank to the mop may be adjusted based on the expected use time and the liquid supply amount per unit time.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner, comprising:
    a body;
    a mop rotatably coupled to the body to wipe a floor;
    an actuator configured to rotate the mop;
    a battery configured to supply power to the actuator;
    a tank configured to store liquid; and
    a controller configured to manage delivery of the liquid from the tank to the mop,
    wherein the controller manages the delivery of the liquid according to a state of the battery,
    wherein the state of the battery includes an expected use time of the battery, and
    wherein the robot cleaner has the expected use time (t1) based on the state of the battery, and the controller manages the delivery of the liquid from the tank such that the liquid is exhausted in a range of times between 0.9*t1 and t1 from a time point when an operation of the robot cleaner is started.

2. The robot cleaner of claim 1, wherein the controller, when managing the delivery of the liquid, is further to manage at least one of a supply amount per unit time, a supply time, or a supply interval of the liquid from the tank to the mop.

3. The robot cleaner of claim 1, wherein the state of the battery further includes one or more of a capacity, a voltage, or a charge rate.

4. The robot cleaner of claim 1, further comprising:
    a supply tube connected to the tank and having an injection nozzle configured to supply the liquid in the tank to the mop; and
    a pump provided on the supply tube,
    wherein the controller, when managing the delivery of the liquid, is further to manage an operation of the pump.

5. The robot cleaner of claim 4, wherein the mop includes a first mop and a second mop configured to contact and wipe the floor,
    wherein the robot cleaner is configured to move by rotation of the first mop and the second mop,
    wherein the controller determines an expected moving distance of the robot cleaner according to the state of the battery, and
    wherein the controller is further to manage the delivery of the liquid from the tank based on the expected moving distance, an amount of liquid consumption per moving distance of the robot cleaner, an amount of the liquid stored in the tank, and a liquid injection amount per unit time of the pump.

6. The robot cleaner of claim 1, wherein the controller is further to manage the delivery of the liquid from the tank according to an amount of liquid consumption per rotation of the mop and an amount of the liquid stored in the tank.

7. The robot cleaner of claim 1, wherein the mop includes a first mop and a second mop configured to contact and wipe the floor,
    wherein the robot cleaner is configured to move by rotation of the first mop and the second mop,
    wherein the controller determines an expected moving distance according to the state of the battery, and
    wherein the controller is further to manage the delivery of the liquid according to the expected moving distance, an amount of liquid consumption per moving distance of the robot cleaner, and an amount of the liquid stored in the tank.

8. The robot cleaner of claim 1, wherein the controller is further configured to derive the expected use time of the battery, and manage the delivery of the liquid according to a supply amount per unit time of the liquid and the expected use time.

9. The robot cleaner of claim 1, wherein the mop includes a first mop and a second mop configured to wipe the floor, and
    wherein the controller is further to adjust a first angle between a rotation axis of the first mop and the floor and a second angle between a rotation axis of the second mop and the floor.

10. A robot cleaner, comprising:
    a body;
    a mop rotatably coupled to the body to wipe a floor;
    an actuator configured to rotate the mop;
    a tank configured to store liquid;
    a tube connected to the tank and including an injection nozzle to output the liquid from the tank to the mop;
    a pump provided on the tube; and
    a battery configured to supply power to the actuator and the pump,
    wherein an operation of the pump is controlled according to a state of the battery,
    wherein the state of the battery includes an expected use time of the battery, and wherein the battery has the expected use time (t1), and the pump is controlled such that the liquid in the tank is exhausted in a time duration in a range between 0 9*t1 and t1 from a time point when operation of the robot cleaner is started.

11. The robot cleaner of claim 10, wherein the state of the battery further includes one or more of a capacity, a voltage, or a charge rate of the battery.

12. A method of controlling a robot cleaner having a mop configured to be rotated and wipe a floor, an actuator configured to rotate the mop, a tank configured to store liquid that is supplied to the mop, and a battery configured to supply power to the actuator, the method comprising:
    determining a state of the battery;
    supplying the liquid from the tank to the mop; and
    supplying power to the actuator to rotate the mop,
    wherein the supplying of the liquid from the tank to the mop is adjusted according to the state of the battery, and
    wherein the state of the battery includes an expected use time (t1) of the battery such that the liquid in the tank is exhausted in a time duration in a range between 0.9*t1 and t1 from a time point when operation of the robot cleaner is started.

13. The method of claim 12, wherein the supplying of the liquid from the tank to the mop is adjusted according to an amount of liquid consumption per rotation of the mop and an amount of the liquid stored in the tank.

14. The method of claim 12, wherein the mop includes a first mop and a second mop configured to wipe the floor by surface contact,
    wherein the robot cleaner is configured to move by rotation of the first mop and the second mop,
    wherein the method further comprises determining an expected moving distance of the robot cleaner based on the state of the battery, and
    wherein the supplying of the liquid from the tank to the mop is adjusted based on the expected moving distance, an amount of liquid consumption per moving distance of the robot cleaner, and an amount of the liquid stored in the tank.

15. The method of claim 12, wherein the mop includes a first mop and a second mop configured to wipe the floor by surface contact,
    wherein the robot cleaner includes a pump configured to supply the liquid in the tank to the mop,
    wherein the robot cleaner is configured to move by rotation of the first mop and the second mop,
    wherein the method further comprises determining an expected moving distance of the robot cleaner based on the state of the battery, and
    wherein the supplying of the liquid from the tank to the mop is adjusted according to the expected moving distance, an amount of liquid consumption per moving distance of the robot cleaner, an amount of the liquid stored in the tank, and an liquid injection amount per unit time by the pump.

16. The method of claim 12, further comprising:
    identifying the expected use time of the battery; and
    determining an amount of the liquid supplied per unit time,
    wherein the supplying of the liquid from the tank to the mop is adjusted according to the expected use time and the amount of the liquid supplied per unit time.

17. The method of claim 12, wherein the robot cleaner includes a pump configured to supply the liquid from the tank to the mop, and
    wherein the supplying of the liquid from the tank to the mop is adjusted based on adjusting operation of the pump.

18. The method of claim 12, wherein the robot cleaner includes a pump configured to supply the liquid from the tank to the mop,
    wherein the method further comprises:
    determining the expected use time of the battery; and
    identifying a liquid supply amount per unit time associated with the pump, and
    wherein the supplying of the liquid from the tank to the mop is adjusted based on the expected use time and the liquid supply amount per unit time.

* * * * *